(12) United States Patent
Sandeløv et al.

(10) Patent No.: US 10,528,941 B2
(45) Date of Patent: Jan. 7, 2020

(54) METHOD FOR ENCRYPTING TRANSACTIONS AT A DYNAMIC TRANSACTION CARD

(71) Applicant: CardLab ApS., Herlev (DK)

(72) Inventors: Frank Sandeløv, Herlev (DK); Thiago Olson, Atlanta, GA (US); Christopher Bartenstein, Ann Arbor, MI (US); Henry Balanon, Ann Arbor, MI (US)

(73) Assignee: CardLab ApS., Herlev (DK)

( * ) Notice: Subject to any disclaimer, the term of this patent is extended or adjusted under 35 U.S.C. 154(b) by 0 days.

(21) Appl. No.: 16/273,771

(22) Filed: Feb. 12, 2019

(65) Prior Publication Data

US 2019/0188687 A1    Jun. 20, 2019

Related U.S. Application Data

(63) Continuation of application No. 15/647,235, filed on Jul. 11, 2017, now Pat. No. 10,248,949, which is a
(Continued)

(51) Int. Cl.
| | |
|---|---|
| *G06Q 20/34* | (2012.01) |
| *G06K 7/08* | (2006.01) |
| *G06K 19/06* | (2006.01) |
| *G07F 7/08* | (2006.01) |
| *H04W 76/10* | (2018.01) |
| *G06Q 20/10* | (2012.01) |
| *G06Q 20/20* | (2012.01) |

(Continued)

(52) U.S. Cl.
CPC ......... *G06Q 20/3415* (2013.01); *G06K 7/087* (2013.01); *G06K 19/06206* (2013.01); *G06Q 20/10* (2013.01); *G06Q 20/20* (2013.01);

*G06Q 20/3223* (2013.01); *G06Q 20/3226* (2013.01); *G06Q 20/3278* (2013.01); *G06Q 20/341* (2013.01); *G06Q 20/352* (2013.01); *G06Q 20/3572* (2013.01); *G06Q 20/385* (2013.01); *G06Q 20/38215* (2013.01); *G06Q 20/4012* (2013.01); *G07F 7/0833* (2013.01); *G07F 7/0853* (2013.01); *G07F 7/127* (2013.01); *H04W 76/10* (2018.02)

(58) Field of Classification Search
None
See application file for complete search history.

(56) References Cited

FOREIGN PATENT DOCUMENTS

WO    WO-2013112839 A1 *   8/2013   ....... G06K 19/07716

* cited by examiner

*Primary Examiner* — Kristy A Haupt
(74) *Attorney, Agent, or Firm* — Run8 Patent Group, LLC; Peter Miller

(57) ABSTRACT

One variation of a method for controlling a dynamic transaction card includes: at a first time, accessing a first cryptogram; at a second time, establishing a wireless connection with a mobile computing device; in response to establishing the wireless connection with the mobile computing device, accessing a first token associated with the first cryptogram from the mobile computing device via the wireless connection; generating a first magnetic stripe sequence command representing the first cryptogram and the first token; and in response to detecting a magnetic stripe card reader proximal a magnetic stripe emulator integrated into the dynamic transaction card at a third time succeeding the second time, driving the magnetic stripe emulator according to the first magnetic stripe sequence command.

21 Claims, 12 Drawing Sheets

Related U.S. Application Data continuation-in-part of application No. 15/016,582, filed on Feb. 5, 2016, now Pat. No. 9,892,405, which is a continuation of application No. 13/904,951, filed on May 29, 2013, now Pat. No. 9,286,561, and a continuation-in-part of application No. 14/542,092, filed on Nov. 14, 2014, now Pat. No. 9,892,357.

(60) Provisional application No. 62/360,844, filed on Jul. 11, 2016, provisional application No. 61/689,083, filed on May 29, 2012, provisional application No. 61/796,594, filed on Nov. 15, 2012, provisional application No. 61/848,581, filed on Jan. 7, 2013, provisional application No. 61/849,213, filed on Jan. 22, 2013, provisional application No. 61/850,866, filed on Feb. 25, 2013, provisional application No. 61/818,831, filed on May 2, 2013, provisional application No. 61/962,709, filed on Nov. 14, 2013, provisional application No. 62/003,430, filed on May 27, 2014.

(51) Int. Cl.
*G06Q 20/32* (2012.01)
*G06Q 20/38* (2012.01)
*G06Q 20/40* (2012.01)
*G07F 7/12* (2006.01)

METHOD FOR ENCRYPTING TRANSACTIONS AT A DYNAMIC TRANSACTION CARD

CROSS-REFERENCE TO RELATED APPLICATIONS

This Application is a continuation of U.S. patent application Ser. No. 15/647,235, filed on 11 Jul. 2017, which claims the benefit of U.S. Provisional Application No. 62/360,844, filed on 11 Jul. 2016, each of which is incorporated in its entirety by this reference.

This Application is a continuation-in-part application of U.S. patent application Ser. No. 15/016,582, filed on 5 Feb. 2016, which is a continuation of U.S. application Ser. No. 13/904,951 filed on 29 May 2013, which claims the benefit of U.S. Provisional Application No. 61/689,083 filed on 29 May 2012, U.S. Provisional Application No. 61/796,594, filed on 15 Nov. 2012, U.S. Provisional Application No. 61/848,581 filed on 7 Jan. 2013, U.S. Provisional Application No. 61/849,213 filed on 22 Jan. 2013, U.S. Provisional Application No. 61/850,866, filed on 25 Feb. 2013, and U.S. Provisional Application No. 61/818,831, filed on 2 May 2013, all of which are incorporated herein in their entireties by this reference.

This Application is a continuation-in-part application of U.S. patent application Ser. No. 14/542,092, filed on 14 Nov. 2014, which claims the benefit of U.S. Provisional Patent Application No. 61/962,709 filed on 14 Nov. 2013, and U.S. Provisional Patent Application No. 62/003,430, filed on 27 May 2014, all of which are incorporated in their entireties by this reference.

This Application is a continuation-in-part application of U.S. patent application Ser. No. 13/904,939, filed on 29 May 2013, which is incorporated in its entirety by this reference.

TECHNICAL FIELD

This invention relates generally to the field of transactional cards and, more specifically, to a new and useful for method for encrypting transactions at a dynamic transaction card in the field of transactional cards.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

As shown in FIGS. 1-4, a method S100 for encrypting transactions at a dynamic transaction card includes: at a first time, accessing a first cryptogram in Block S110; at a second time, establishing a wireless connection with a mobile computing device in Block S120; in response to establishing the wireless connection with the mobile computing device, accessing a first token associated with the first cryptogram in Block S130; generating a first magnetic stripe sequence command representing the first cryptogram and the first token in Block S140; and in response to detecting a magnetic stripe card reader proximal a magnetic stripe emulator integrated into the dynamic transaction card at a third time succeeding the second time, driving the magnetic stripe emulator according to the first magnetic stripe sequence command in Block S150.

2. Applications

Figure 1:
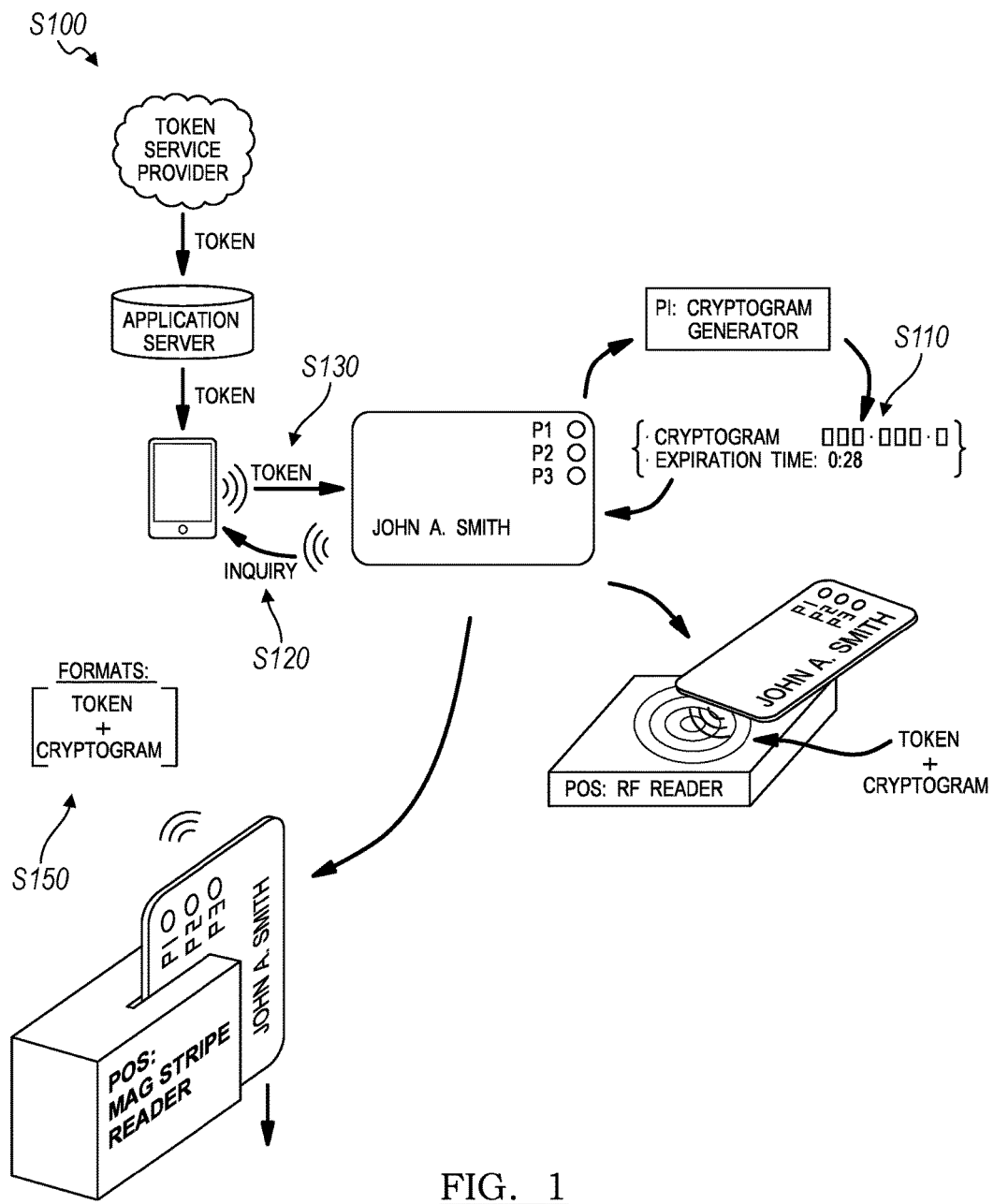
FIG. 1 is a flowchart representation of a method.

Generally, as shown in FIG. 1, the method S100 can be executed on a reprogrammable (e.g., "dynamic") transaction card—such as described in U.S. patent application Ser. No. 13/904,939—to emulate various tokenized transactions methods (e.g., a credit card, a debit card, etc.) in one physical card by selectively broadcasting tokens and cryptograms for a selected transaction (or payment) method over radio-frequency communication protocol or via a magnetic stripe emulator.

The dynamic transaction card is preprogrammed (e.g., during manufacture) with a static cryptogram (or a set of static cryptograms or a cryptogram generator) and an identifier (e.g., a serial number, a Bluetooth address). Once the dynamic transaction card is acquired by a user, the user can link the dynamic transaction card to a native application (e.g., smartphone "app" or browser-based application) executing on his mobile computing device (e.g., smartphone, tablet), such as by the identifier programmed into the dynamic transaction card. The user can thus "load" transaction methods—such as credit cards, debit cards, gift cards, door access cards, personal identification cards, rewards cards, etc.—onto the dynamic transaction card via the native application. For example, the user can manually enter a credit card number, expiration data, CVV, billing address, and owner's name into an interface within the native application.

Alternatively, the user can capture an image of a credit card with a camera integrated into the mobile computing device, and the native application can implement optical character recognition methods and techniques to extract relevant credit card information from the image. Yet alternatively, the user can link a transaction account related to the credit card to the native application (e.g., a credit card account), and the native application can retrieve relevant transaction data for the credit card from the transaction account (e.g., hosted by a third-party issuer or token generator). However, the user can link transaction methods to the user's native application in any other suitable way.

Figure 2:
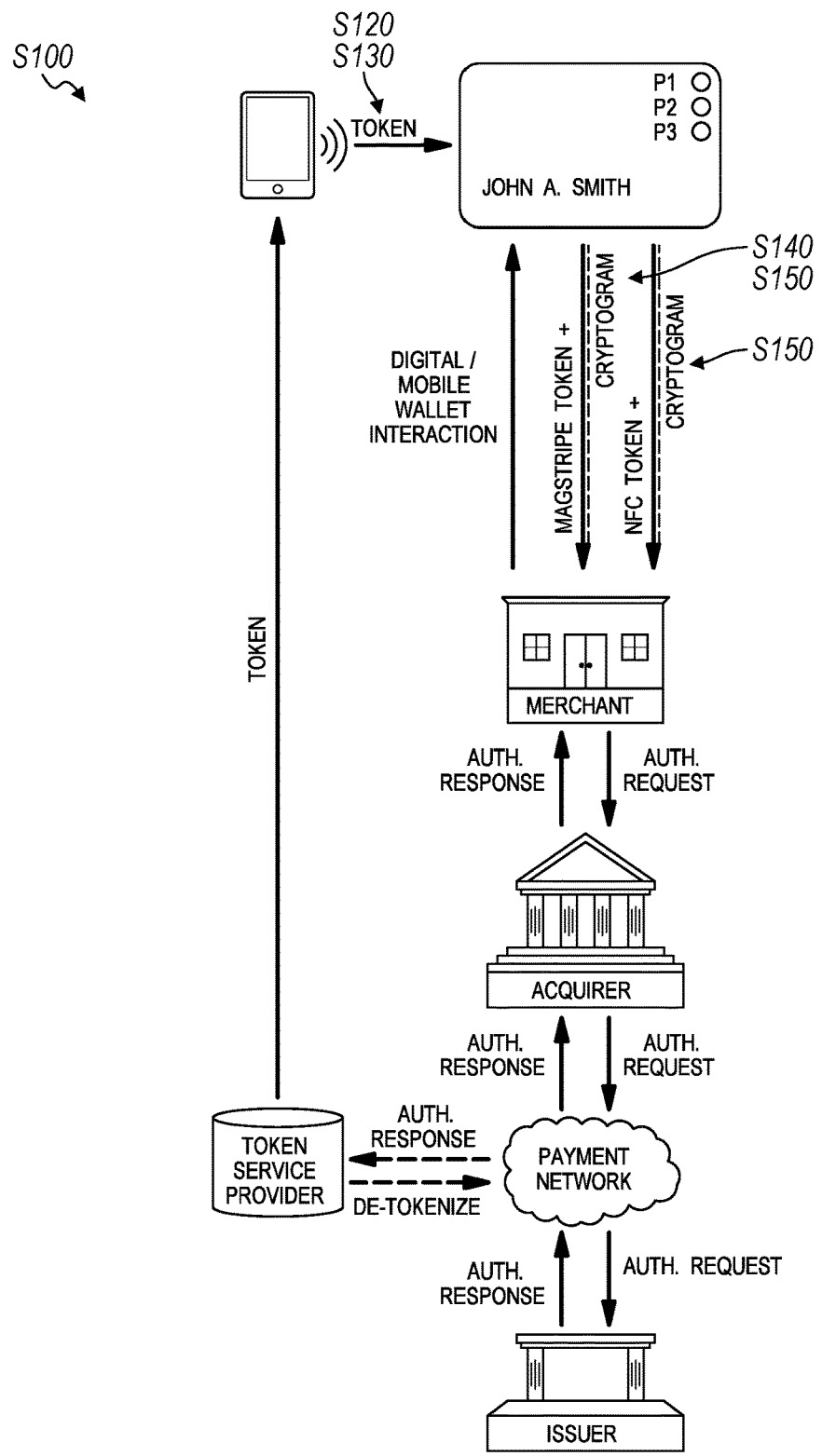
FIG. 2 is a flowchart representation of the method.

In one implementation, the native application generates a magnetic stripe sequence command from credit card data thus entered directly into the native application or retrieved by the native application. The native application can then upload this magnetic stripe sequence command to the dynamic transaction card for emulation by the magnetic stripe emulator within the dynamic transaction card during a subsequent transaction. As shown in FIG. 2, the native application also manipulates these credit card data to retrieve, from a remote server (i.e., affiliated with a token generator), a transaction token corresponding to the credit card. For example, the native application can retrieve the transaction token representing an encrypted credit card number and/or credit card account information. The native application can then upload the transaction token to the dynamic transaction card for broadcast by the radio-frequency wireless transmitter within the dynamic transaction card during a subsequent transaction.

In an alternative implementation, the native application manipulates credit card data thus collected to retrieve from a remote server a transaction token corresponding to the credit card and then uploads the transaction token to the dynamic transaction card. In this implementation, the dynamic transaction card associates the transaction token with a cryptogram pre-loaded onto the dynamic transaction card, such as a by manufacturer of the dynamic transaction card or by a processing house seeding the dynamic transaction card with the cryptogram. Then the dynamic transaction card can transform the transaction token and the (pre-loaded) cryptogram into a magnetic stripe sequence command. The dynamic transaction card can then drive the magnetic stripe emulator according to the magnetic stripe sequence command when a magnetic stripe card reader is detected near the dynamic transaction card. In this implementation, the radio-frequency wireless transmitter similarly broadcasts a form of the transaction token and the new cryptogram when a wireless transaction reader (e.g., a near-field communication reader) is detected near the dynamic transaction card.

In the foregoing implementations, a tokenized transaction method can be enabled on the dynamic transaction card by routing a token—for a new transaction method loaded into the native application executing on the user's computing device—from a remote server (e.g., a token generator), through the mobile computing device, to the dynamic transaction card, as shown in FIG. 2. (Alternatively, the dynamic transaction card can generate the token via a token generator stored locally on the dynamic transaction card, wherein outputs of the local token generator on the dynamic transaction card are known by a select external entity—such as the affiliated financial institution or an authentication server—to authenticate a transaction with the dynamic transaction card based on alignment between a token and cryptogram received from the dynamic transaction card at a POS system.) The dynamic transaction card can then associate the token with a cryptogram (e.g., a static cryptogram preloaded onto the dynamic transaction card with a new cryptogram generated by a cryptogram generator programmed into the dynamic transaction card), such as by generating a magnetic stripe sequence command representing the token and the cryptogram. The dynamic transaction card can then emulate the corresponding transaction method by transmitting a form of the token and the cryptogram via the magnetic stripe emulator and/or via the radio-frequency transmitter. Thus, the dynamic transaction card can execute the method S100 to emulate a particular tokenized transaction method in magnetic stripe-based transactions and/or in radio-frequency-based transactions selectively as needed, such as based on local availability of a wireless transaction reader and a magnetic stripe card reader to read transaction method data from the dynamic transaction card. The dynamic transaction card can further execute the method S100 to similarly and selectively emulate various tokenized transaction methods in both radio-frequency-based transactions and in magnetic stripe-based transactions over time.

In one implementation, a first financial institution (e.g., a credit card company) sponsors manufacture and distribution of the dynamic transaction card, which may be characterized by production costs significantly greater than standard magnetic stripe credit cards and may be configured to emulate an encrypted credit card through a dynamic magnetic stripe emulator. Once issued to a user, the dynamic transaction card can communicate encrypted payment-related information to magnetic-stripe-type point of sale (hereinafter "POS") systems at vendors in exchange for goods and services on behalf of the user, thereby yielding improving security and reduced risk of fraud—related to standard magnetic stripe credit cards—for the financial institution. For example, during a transaction, the dynamic transaction card can emulate through the magnetic stripe emulator a particular cryptogram (preloaded on the dynamic transaction card) and a token representing account information of the virtual credit card issued by the first financial institution.

Additionally, the dynamic transaction card can be configured to emulate virtual credit cards issued by other (e.g., competitor) financial institutions. In this example, the dynamic transaction card can be configured to emulate a virtual encrypted credit card issued by a first financial institution that subsidized manufacture and distribution of the dynamic transaction card. However, upon receipt and authorization of the dynamic transaction card by a user within an account in the financial institution, the user can load other non-encrypted credit cards and other transaction cards (e.g., loyalty cards) onto the dynamic transaction card for emulation during subsequent transactions. However, because the dynamic transaction card supports emulation of an encrypted payment method(s) authorized by the financial institution that issued the dynamic transaction card, this encrypted payment method may become the user's default payment method when making in-person purchases from vendors with the dynamic transaction card despite availability of other payment methods from other financial institutions also loaded onto the dynamic transaction card, which may provide the issuing financial institution greater leverage over its competitors and enable the issuing financial institution an opportunity to recover the cost of issuing the dynamic transaction card to the user.

Alternatively, multiple financial institutions may subsidize the dynamic transaction card; and the dynamic transaction card can be configured to emulate encrypted transaction methods (e.g., virtual credit cards and/or virtual debit cards) issued by each of these financial institutions, such as with one common or multiple unique cryptograms loaded onto the dynamic transaction card during its manufacture.

Figure 7:
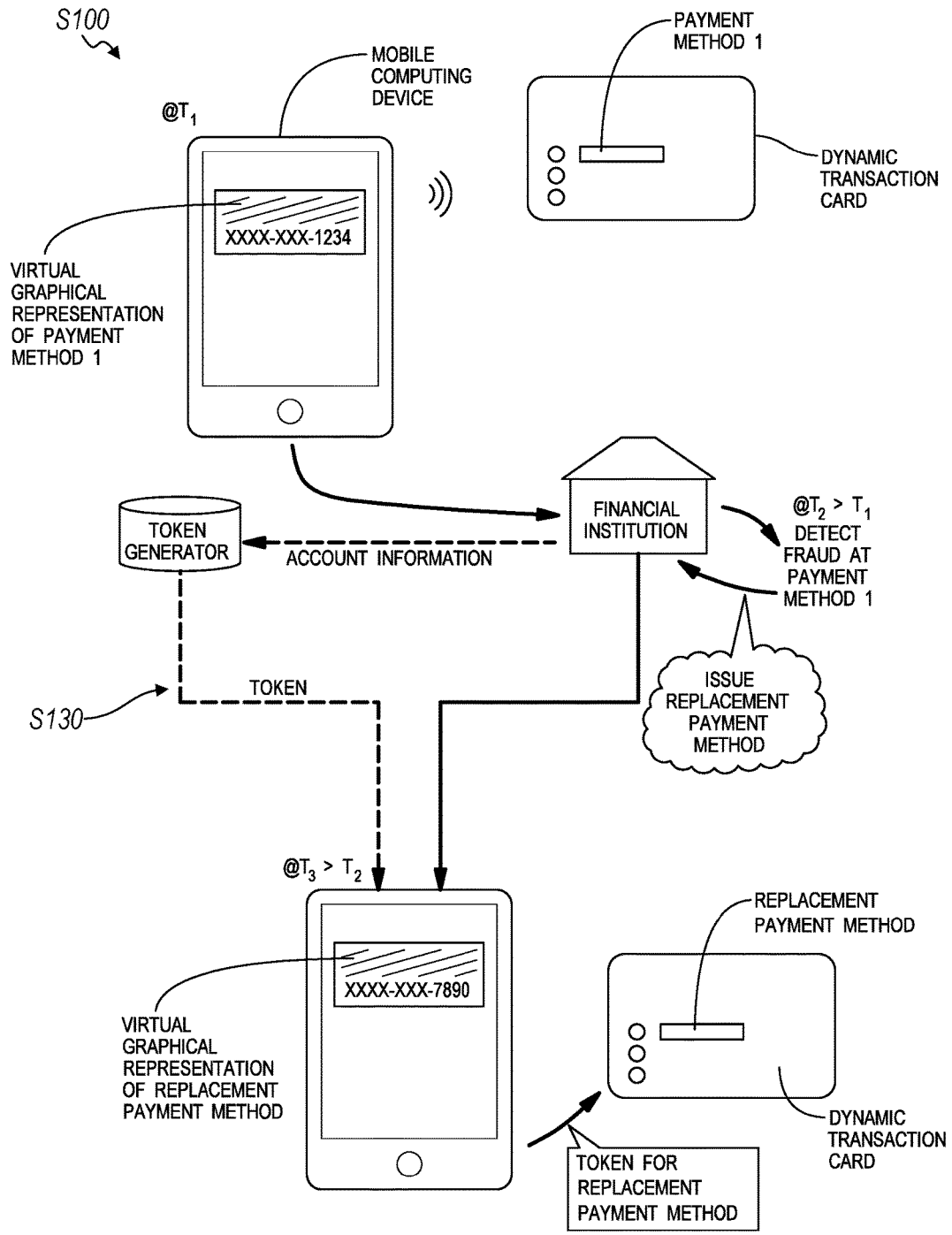
FIG. 7 is a flowchart representation of the method.

Additionally, as shown in FIG. 7, the issuing financial institution may remotely and immediately (e.g., nearly instantaneously) issue a replacement virtual credit card to the dynamic transaction card, such as over a computer network (e.g., the Internet) and via the user's smartphone when fraud or other issues with the user's payment account are detected. For example, in response to detecting fraud associated with a credit card or other transaction account issued to a user and loaded onto the user's dynamic transaction card, a financial institution affiliated with the credit card account may "replace" the credit card account by issuing a new virtual credit card to the user's account. The dynamic transaction card can instantiate the new virtual credit card for use as a physical transaction (e.g., credit) card by receiving a new token from a token generator—local or remote from the dynamic transaction card—associated with the new virtual credit card. For example, the dynamic transaction card can instantiate the new virtual credit card for use as a physical transaction card through the dynamic transaction card by marrying a new token (or token generator) representing the new virtual card with a cryptogram (or cryptogram generator) stored on the dynamic transaction card to generate a new magnetic stripe sequence command that, when output by the magnetic stripe emulator, may be authenticated by a payment processor, financial institution, or other authentication server to complete payment with the virtual credit card. Alternatively, the dynamic transaction card can instantiate the new virtual credit card for use as a physical transaction card through the dynamic transaction card by merging PAN or other data representing the new virtual credit card with a token or cryptogram stored locally on the dynamic transaction card or in the native application to generate a new magnetic stripe sequence command.

The dynamic transaction card can also receive a graphical representation of the new virtual credit card that, when rendered within the native application executing on the user's smartphone, communicates to the user that her credit card has been replaced. Thus, the financial institution may avoid mailing a new physical credit card to the user, which may otherwise be inconvenient for the user and result in reduced use of the credit card by the user.

3. Terms and Definitions

Figure 3:
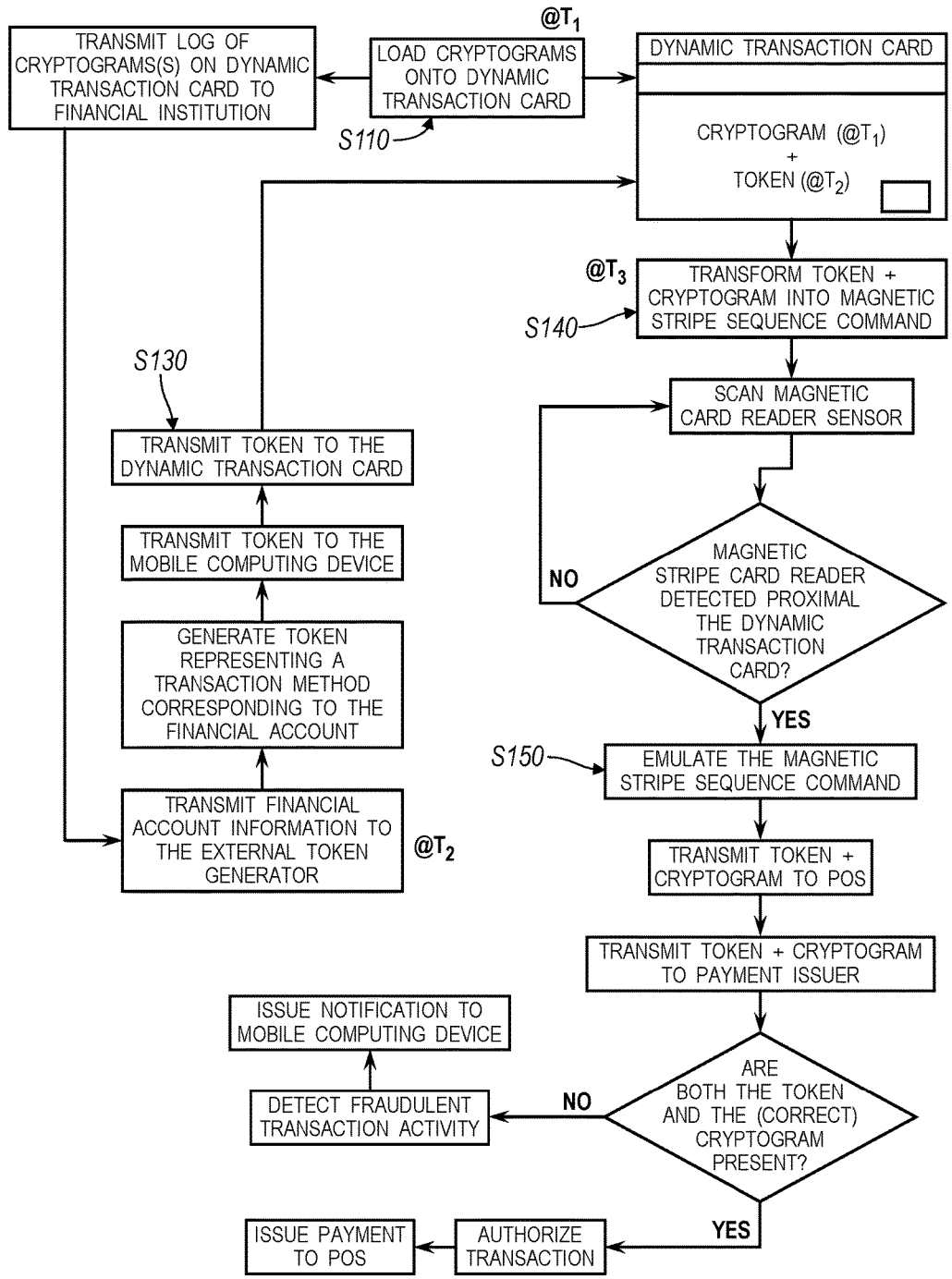
FIG. 3 is a flowchart representation of the method.
Figure 4:
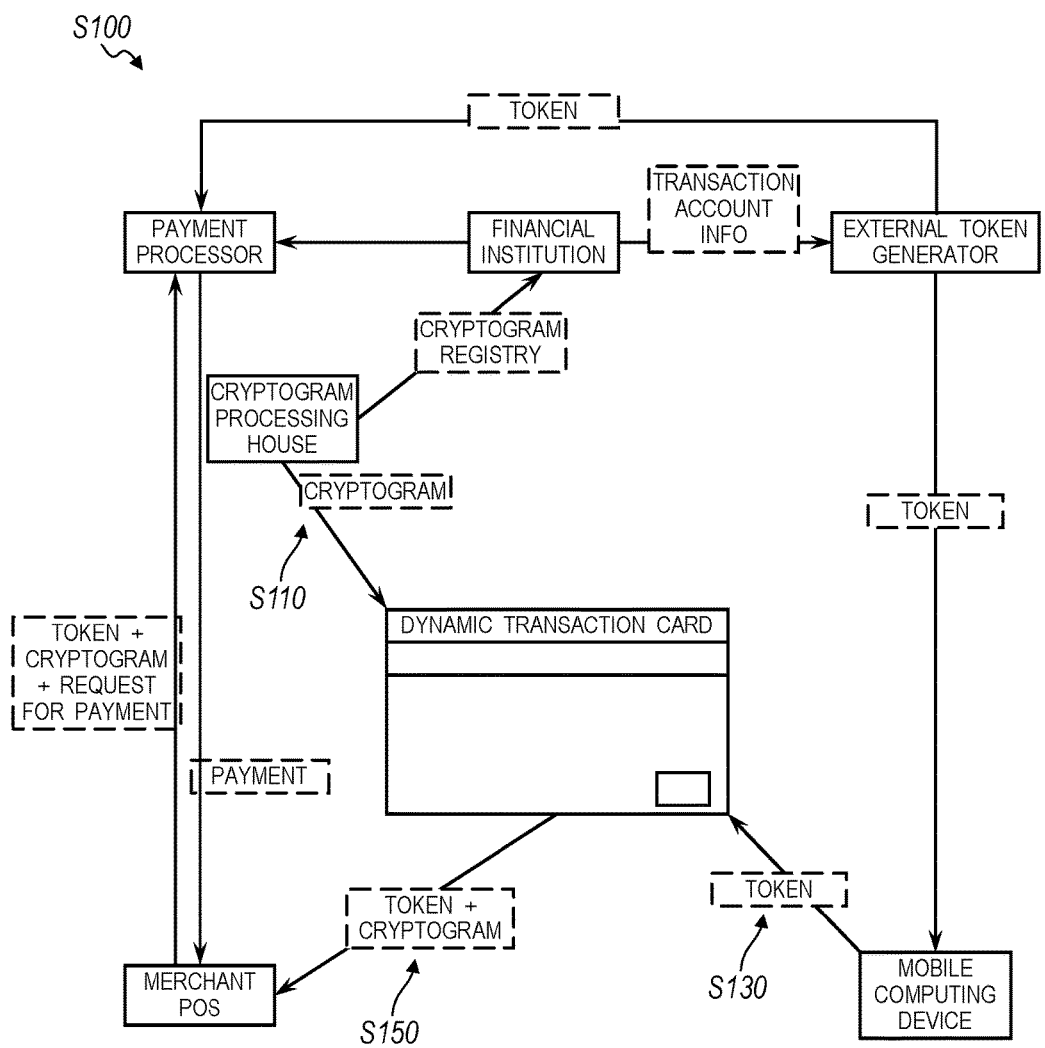
FIG. 4 is a flowchart representation of the method.

As shown in FIGS. 3 and 4, Blocks of the method S100 can be executed by a dynamic transaction card issued to a user and a native application executing on the user's mobile computing device (e.g., smartphone, smartwatch) to emulate magnetic stripe sequences of virtual transaction cards issued to the user from one or more financial institutions. Generally, the method S100 can be implemented to conceal sensitive transaction information (e.g., account numbers, account holder information, CVV, etc.) before, during, and after financial transactions at points of sale. In particular, Blocks of the method S100 can be implemented by the dynamic transaction card and the native application to output encrypted payment information to a POS system configured to otherwise (only) accept magnetic stripe data, thereby reducing risk of hacking, fraudulently spoofing, or other fraudulent use of data intercepted from the POS system (or from the dynamic transaction card itself, the native application, etc.)

In one implementation, a mobile computing device (e.g., a smartphone or tablet) wirelessly connected to the dynamic transaction card cooperates with a financial institution— such as a bank, a credit union, a credit card company, a loyalty rewards program host, etc.—to download account information for a transaction method (e.g., a credit card, a debit card, a loyalty card, etc. affiliated with a user's financial account) from the financial institution and stores this account information in local memory on the mobile computing device.

During manufacture of a dynamic transaction card, a dynamic transaction card manufacturer may load a static cryptogram (or a set of static cryptograms or a cryptogram generator) onto the dynamic transaction card, wherein each cryptogram preloaded onto the dynamic transaction card functions as a unique encrypted identifier of the dynamic transaction card. The dynamic transaction card manufacturer can issue a log linking a set of dynamic transaction cards produced by the dynamic transaction card manufacturer to unique cryptograms loaded onto these dynamic transaction cards. Additionally or alternatively, the dynamic transaction card manufacturer can issue a log (or registry) of cryptograms output by the cryptogram generator stored locally on the dynamic transaction card; a payment processor and the financial institution can cooperate to authenticate a transaction with the dynamic transaction card based on alignment between a token and cryptogram received during the transaction and based on an expected cryptogram, as indicated in the log.

The financial institution (and/or the dynamic transaction card manufacturer) can then send the dynamic transaction card to a user (i.e., an account holder at the financial institution), such as via a physical mail service. Upon receipt of the dynamic transaction card, the user may trigger the dynamic transaction card to wirelessly pair to her smartphone. Through a native application executing on her smartphone, the user may then request authorization of the dynamic transaction card, such as by logging in to her financial account—hosted by the financial institution— within the native application.

In response to a request to authorize the card—such as including a unique identifier of the dynamic transaction card, the cryptogram loaded onto the dynamic transaction card, and/or login information entered by the user within the native application—received from the user via the native application, the financial institution may: identify the dynamic transaction card based on the log described above; confirm a match between the dynamic transaction card and the account information provided by the user; and query a token generator to generate a token (e.g., an encrypted representation of sensitive account information, such as a credit card number) if the cryptogram, dynamic transaction card, and user account information match. The token generator can then return this token to the mobile computing device via the Internet. Upon receipt of the token, the native application can: visually indicate to the user that the dynamic transaction card has been authorized; store the token in local memory on the mobile computing device and upload the token to the dynamic transaction card immediately before a transaction with a POS system; or transmit the token to the dynamic transaction card immediately for local storage on the dynamic transaction card. (Alternatively, the dynamic transaction card can be loaded with a token generator integrated into the dynamic transaction card. The token generation can generate a single-use or multi-use token for emulation during a transaction method.)

Upon receipt of the token, the dynamic transaction card can associate the token with the cryptogram, such as by compiling these data into a magnetic stripe sequence command thereby correlating the transaction method represented by the token with a unique identifier of the dynamic transaction card. Subsequently, in response to detecting a magnetic stripe card reader of a POS system proximal the dynamic transaction card, the dynamic transaction card (e.g., a controller in the dynamic transaction card) can drive the magnetic stripe emulator according to the magnetic stripe sequence command, thereby communicating both the cryptogram and the token to the POS system. The POS system can then transmit these encrypted data to a payment processor, which interfaces with the token generator and/or the financial institution to authenticate these encrypted data as a proper token and cryptogram pair before debiting and crediting of the user's account and the merchant's account to complete the transaction. (However, in response to receipt of the token exclusively (i.e., without the cryptogram) or receipt of the token with a different cryptogram, the payment processor may flag the transaction as fraudulent or otherwise unexpected.)

However, the financial institution, token generator, and/or payment processor may authorize encrypted transactions and issue payment for encrypted transactions affiliated with a particular transaction method in any other way.

Furthermore, the dynamic transaction card, as described below, can accept and emulate multiple other transaction methods (e.g., payment methods, loyalty rewards programs)—unaffiliated with the same financial institution—in addition to the (primary) transaction method described above. However, the dynamic transaction card can transmit unencrypted (raw) account information representing these other transaction methods to POS systems during other transactions in which these transaction methods are selected by the user for emulation, as described below.

4. Dynamic Transaction Card

As described in U.S. patent application Ser. No. 13/904,939 and shown in FIGS. 2A, 2B, and 2C, the dynamic transaction card can include: a sheet; a transducer arranged within the sheet and configured to output a voltage in response to an impulse on a surface of the sheet; a wireless communication module; a first input region adjacent the first icon; a second input region adjacent the second icon; a magnetic stripe emulator; a magnetic stripe card reader sensor configured to detect a magnetic stripe card reader proximal the dynamic transaction card; and a controller arranged within the sheet and configured to transition from a passive state (e.g., an inactive mode, an off state, a sleep state) into an active mode (e.g., a payment mode) in response to receiving a voltage output from the transducer. The controller can also be configured to receive a first token with a first transaction method and a second token associated with a second transaction method through the wireless communication module, and to selectively drive the magnetic stripe emulator to emulate the first token and to emulate the second token based on a selection of the first and second transaction methods and in response to detecting a magnetic stripe card reader proximal the sheet.

The dynamic transaction card can also include: (local) memory storing a cryptogram (and/or a cryptogram generator) and a token corresponding to a transaction method loaded on the dynamic transaction card; a radio-frequency transmitter or other transmitter and/or receiver configured to broadcast a cryptogram and a form of a token of a selected transaction method in response to detection of a radio-frequency card reader proximal the dynamic transaction card; and/or a biometric sensor configured to read a fingerprint from a user and to authenticate use of the dynamic transaction card in a subsequent transaction based on the fingerprint.

Generally, the dynamic transaction card functions to consolidate multiple plastic transaction cards into a single physical card that can imitate payment functionalities of the multiple plastic transaction cards by selectively broadcasting signals from a magnetic stripe emulator and/or a radio-frequency transmitter integrated into the dynamic transaction card. For example, the dynamic transaction card can imitate a user's debit card issued through a bank, a user's primary credit card issued by a preferred credit card company, and a user's secondary credit card issued by another credit card company by selectively driving the magnetic stripe emulator—both through the magnetic stripe emulator—according to a token assigned to each of the transaction methods and a cryptogram assigned to the dynamic transaction card. The dynamic transaction card can also imitate a gift card, an identification (i.e., ID) card (e.g., a driver's license), a loyalty card (e.g., for a loyalty rewards program), a door or gate access card, or any other magnetic stripe-based and/or tokenized transaction card.

As described below, the dynamic transaction card can include multiple "payment slots," each holding data (e.g., a magnetic stripe sequence command) pertaining to a particular transaction method loaded onto the dynamic transaction card. For example, a "first payment slot" on the dynamic transaction card can "hold" (e.g., point to) a token corresponding to a credit card and a cryptogram identifying the "first payment slow"; a "second payment slot" on the dynamic transaction card can hold a token corresponding to a debit card and a cryptogram identifying the "second payment slow"; and a "third payment slot" on the dynamic transaction card can hold unencrypted transaction information corresponding to a gift card. A user can thus select one of the first, second, and third slots on the dynamic transaction card (e.g., by selecting a corresponding input region on the dynamic transaction card, as described in U.S. patent application Ser. No. 13/904,939, or by selecting a corresponding notification on a mobile computing device wirelessly connected to the dynamic transaction card, as described in U.S. patent application Ser. No. 14,542,092) to set the dynamic transaction card to emulate the correspond transaction method in an upcoming transaction. Subsequently, the dynamic transaction card can drive the magnetic strip emulator according to a magnetic stripe sequence command, corresponding to a token for the selected transaction method and a cryptogram, when the dynamic transaction card is swept past a magnetic stripe card reader (e.g., a magnetic stripe card reader). The radio-frequency transmitter can broadcast a form of the token for the selected transaction method and the cryptogram when the dynamic transaction card is tapped on or otherwise brought within wireless communication range of a wireless transaction reader (e.g., an NFC reader). The dynamic transaction card can also interface with a mobile computing device to download new transaction method data to payment slots on the dynamic transaction card, to delete transaction method data from the dynamic transaction card, to control transaction card functions asynchronously or in real-time, to authenticate an upcoming transaction, etc.

Furthermore, the dynamic transaction card can define a form factor substantially similar to that of a standard plastic transaction card, that is, 3.370" (85.60 mm) wide by 2.125" (53.98 mm) tall by 0.06" thick.

5. Cryptogram Generation

Block S110 of the method S100 recites, at a first time, accessing a first cryptogram. Generally, Block S110 of the method functions to load a cryptogram—representing an encrypted identifier of the dynamic transaction card—onto the dynamic transaction card and store the cryptogram in local memory of the dynamic transaction card.

In one implementation, an external third party (e.g., a processing house, manufacturer, or financial institution) can generate a static cryptogram and preload this cryptogram onto the dynamic transaction card, such as during its manufacture. For example, a cryptogram can include a unique and encrypted identifier—such as an alphanumeric card address, an encrypted card number, and/or a binary bit sequence identifier—corresponding to and identifying a dynamic transaction card. During a transaction, the dynamic transaction card can output a magnetic sequence that represents the cryptogram in lieu of an unencrypted static identifier of the dynamic transaction card itself (e.g., the dynamic transaction card's serial number or wireless address) in order to further obscure the dynamic transaction card and the identity of its owner.

Alternatively, as described below, the dynamic transaction card can be preloaded with a local cryptogram generator configured to generate a unique cryptogram for emulation during a sequence of transactions or singular transactions.

6. Tokens

Block S120 of the method S100 recites establishing a wireless connection with a mobile computing device; and Block S130 of the method S100 recites, in response to establishing the wireless connection with the mobile computing device, accessing a first token associated with the first cryptogram. Generally, in Blocks S120 and S130, the dynamic transaction card connects to the user's mobile computing device via a wireless network (e.g., a local ad hoc network) to retrieve data pertinent to completing a transaction method stored on the dynamic transaction card. In particular, the dynamic transaction card can execute Blocks S120 and S130 to download (and/or generate) a token corresponding to a particular transaction method—accessed previously by the native application executing on the user's computing device, as described above—which the dynamic transaction card then combines with the cryptogram to generate a magnetic stripe sequence command for this transaction method.

In one implementation and as described below, the dynamic transaction card is paired to the user's computing device, such as over short-range wireless communication protocol (as described in U.S. patent application Ser. No. 13/904,939), and the native application executing on the mobile computing device stores an identifier (e.g., a unique wireless address) of the dynamic transaction card. When a new transaction method is loaded into the native application,—such as by manual data entry, by optical character recognition of text in an image of a tangible plastic transaction card, or by accessing a related transaction account from a third party, as described above—the native application transmits a request for a token for the transaction method to a token service provider (i.e., an external token generator) or to a local token generator stored locally on the dynamic transaction card or the mobile computing device. The token generator generates a token for the transaction method and communicates the token to the mobile computing device; the mobile computing device then uploads the token with an identifier of the corresponding transaction method to the dynamic transaction card. (The native application can also store a local copy of the token in memory on the mobile computing device and occasionally upload the token to the dynamic transaction card based on requests to emulate the transaction method entered into the native application by the user over time.)

Alternatively or additionally, the token can be a tokenized number, corresponding to a primary account number (hereinafter "PAN"), which, in turn, is associated with a transaction method. The token is preferably sent from the mobile computing device through an encrypted communication method to the dynamic transaction card, but can alternatively be otherwise communicated. Subsequently, when a transaction is made with the dynamic transaction card with the transaction method selected, a POS system receives (a form of) the token and a cryptogram at the dynamic transaction card specifically for the transaction; the token and the cryptogram are then routed from the POS system, through an acquirer, to a payment network.

In another variation, when a transaction is made with the dynamic transaction card, a local token generator—stored on the dynamic transaction card and synchronized with an authentication server—can generate a token and the dynamic transaction card can communicate the token, encrypted (e.g., "tokenized") PAN, PAN, or other payment account identifier to the POS system through the magnetic stripe emulator, transmitter (e.g., antenna), or other communication means, and the native application executing on the user's computing device can communicate the cryptogram to the POS system. The token and cryptogram are then routed from the POS to the payment network.

In the foregoing variation, the dynamic transaction card can store a counter of swipes of the dynamic transaction card through a POS system in which the transaction method is set for emulation, and the dynamic transaction card can pass a value from this counter through the local token generator to generate the token. Each time the dynamic transaction card detects a magnetic read head nearby and motion through a POS system, the dynamic transaction card can index the counter. Similarly, the authentication server can: maintain a remote counter for this transaction method at the dynamic transaction card; index this remote counter each time a cryptogram or other identifier of the transaction method at the dynamic transaction card is received from a POS; and predict a token output by the dynamic transaction card during a next transaction in which the transaction method is set for emulation based on the state of this second counter and a remote copy of the token generator. When the dynamic transaction card connects wirelessly to the mobile computing device during or after a transaction, the native application can interface with the dynamic transaction card and the authentication server to reconcile the local counter stored on the dynamic transaction card and the remote counter.

Alternatively, the dynamic transaction card can synchronize an internal timer with a global time (e.g., UTC time) when a wireless connection is established with the mobile computing device and then pass a value from the internal timer—at a time that a transaction at the dynamic transaction card is detected—into the token generator to generate a token for the transaction. Upon receipt of transaction data from a POS system, the authentication server can predict the token output by the dynamic transaction card during this transaction based on the time (e.g., a five-minute time window) in which the transaction data was received and a remote copy of the token generator. Similarly, the dynamic transaction card can append the magnetic stripe sequence command with a value (i.e., a timestamp) read from the internal timer at the time of a detected transaction and output this time—in binary form—to a POS system during the transaction. The authentication server can then extract this timestamp from a bitstring received from the POS system during the transaction, pass this timestamp through a remote copy of the token generator, and then authenticate the transaction based on alignment between the token extracted from the bitstring and the token calculated remotely by the authentication server.

In another variation, when a transaction is made with the dynamic transaction card, the dynamic transaction card can communicate the token, tokenized PAN, PAN, or other payment account identifier to the POS system through the magnetic stripe emulator, transmitter (e.g., antenna), or other communication means, the POS system can route the token to the token generator, acquirer, and/or payment network, the token generator, acquirer, and/or payment network can generate and send a request to the user account associated with the dynamic transaction card, and a native application executing on the user's computing device can send the cryptogram to the requesting entity for payment verification. The payment network then cooperates with an issuer of the transaction method and the token generator: to confirm the identity of the dynamic transaction card emulated in the transaction method by accessing a registry of cryptograms associated with the dynamic transaction card; to decrypt the cryptogram by retrieving—from a domain name system affiliated with an issuer of the dynamic transaction card— cryptographic protocols corresponding to the cryptogram (and/or cryptogram generator) programmed into the dynamic transaction card; to decrypt the token to identify the transaction method; to authenticate the transaction with the transaction method based on the decrypted cryptogram and the decrypted token, and to pass back to the POS system confirmation of the transaction, such as in the form of a PAN product identifier and a token assurance level.

Furthermore, in Block S130, the native application can request a group of tokens for a (particular) transaction method and select—randomly or sequentially—a token, from the group of tokens, to transmit to the dynamic transaction card for a current or next transaction. For example, the dynamic transaction card can receive a group of seven tokens from an external token generator, wherein each token in the group of seven tokens corresponds to a first transaction method (e.g., a first credit card) enabled at the native application and dynamic transaction card. In response to activation of the dynamic transaction card at a first time, such as by a user tapping, bending, or otherwise applying an input to a surface of the dynamic transaction card, the dynamic transaction card can: transmit a query for a token to the mobile computing device; receive a first token selected randomly from the group of seven tokens from the mobile computing device; output a first magnetic stripe sequence command representing the first token and the cryptogram through the magnetic stripe emulator when subsequently swiped through a magnetic stripe reader within a POS system; and then delete the first token and the first magnetic stripe sequence command from local memory. At a later time, in response to activation of the dynamic transaction card, the dynamic transaction card can: transmit a query for a token to the mobile computing device; receive a second token selected randomly from the group of seven tokens from the mobile computing device; output a second magnetic stripe sequence command representing the second token and the cryptogram through the magnetic stripe emulator when subsequently swiped through a magnetic stripe reader within another POS system; and then delete the second token and the second magnetic stripe sequence command from local memory.

However, the native application executing on the mobile computing device can retrieve a token for a new transaction method in any other way.

The dynamic transaction card can thus execute Block S130 to download a token for a particular transaction method from the user's computing device. Similarly, the dynamic transaction card can further download a magnetic stripe sequence command for the transaction method from the mobile computing device, such as described below and in U.S. patent application Ser. No. 13/904,939.

6.1 Visual Representation

Additionally, as shown in FIG. 7, the native application can receive additional information about the token and/or the transaction method from the external token generator concurrently with the token. For example, the mobile computing device can download both a first token and a graphical representation of the transaction method associated with the first token, such as an icon or thumbnail image of a virtual credit card, a credit card number, a financial account, or the financial institution. In response to receipt of the graphical representation of the transaction method and activation of the transaction method at the dynamic transaction card, the native application can render the graphical representation of the transaction method in order to communicate to the user that this transaction method has been activated and loaded onto the dynamic transaction card.

However, the native application executed by the mobile computing device can request and download any other additional information related to the token and/or the transaction method associated with tokens received by the mobile computing device.

6.2 Storing Tokens

Furthermore, the dynamic transaction card can intransiently store a token in memory (or a local token generator can generate a token locally) and the dynamic transaction card emulate this token and corresponding cryptogram during each subsequent use of the dynamic transaction card in which this transaction method is selected, as described below. Alternatively, the native application can store the token in local memory on the mobile computing device and transmit this (single-use or multi-use) token to the dynamic transaction card immediately before a transaction with the dynamic transaction card for which a corresponding transaction method is selected.

In one implementation, the mobile computing device can store the token in local memory of the mobile computing device and selectively transmit the token (or a form of the token) to the dynamic transaction card in response to a query from the dynamic transaction card. For example, the dynamic transaction card can detect an input (i.e., applied by a user) proximal a surface of the dynamic transaction card activating the dynamic transaction card for emulation of a magnetic stripe sequence command during a transaction. In response to activation of the dynamic transaction card, the dynamic transaction card can submit a query to the mobile computing device for a token in preparation for a future transaction. Thus, the mobile computing device can transmit a stored token in response to the query.

In another implementation, the mobile computing device requests a token from the (local or external) token generator (e.g., on behalf of a financial institution affiliated with the dynamic transaction card), receives an encrypted token from the token generator, and uploads the encrypted token to the dynamic transaction card. In this implementation, the dynamic transaction card can further decrypt the encrypted token and store the decrypted token in memory of the dynamic transaction card and/or the mobile computing device.

In the foregoing implementation, the dynamic transaction card can store the token (or a decrypted form of the token) in local memory of the dynamic transaction card. In this implementation, the dynamic transaction card can confirm receipt of the token from the mobile computing device by transmitting a confirmation notice to the mobile computing device. In response to confirmation of receipt of the token, the mobile computing device can delete the token from local memory.

In another implementation, the native application executed by the mobile computing device can also request and store a new token for the transaction method each time the transaction method is selected for emulation by the dynamic transaction card, each time the transaction method is selected for upload to the dynamic transaction card (e.g., in place of an alternative transaction method loaded into the native application and/or into the user's dynamic payment account), and/or when (e.g., just before, just after) the token expires, as specified in a token expiration date received with the token from the token generator. Thus, generally, the mobile computing device can receive and transmit single-use tokens to the dynamic transaction card for emulation during a single transaction and, thus, delete the single-use tokens after use (i.e., emulation by the magnetic stripe emulator) or expiration of a threshold period of time (e.g., ten minutes) succeeding receipt of the single-use token.

For example, in response to activation of the dynamic transaction card and default or active selection of a particular transaction method at the dynamic transaction card, the dynamic transaction card can transmit a query for a token for the particular transaction method to the mobile computing device over the wireless connection. Upon receipt of this query, the native application can request a single-use token from an external token generator and receive a first token from the external token generator on behalf of a financial institution affiliated with the dynamic transaction card. The native application can then: return the first token to the dynamic transaction card; receive confirmation of receipt of the first token by the dynamic transaction card; and delete the first token from local memory on the mobile computing device. Furthermore, in this example, in response to emulation of the first token and the cryptogram by the magnetic stripe emulator during a subsequent transaction (e.g., in response to detecting a magnetic stripe card reader near the dynamic transaction card), the dynamic transaction card can delete the first token from local memory on the dynamic transaction card. For additional security, the dynamic transaction card can delete the first token from local memory—regardless of whether the magnetic stripe emulator emulated the first token during a transaction—after expiration of a threshold duration of time (e.g., five minutes) following receipt of the first token from the mobile computing device.

However, the dynamic transaction card and the mobile computing device can access and store one or more single- or multi-use tokens in another way local to and/or remote from the dynamic transaction card.

7. Transaction Authentication

In one variation, the dynamic transaction card authenticates use of the dynamic transaction card for a subsequent transaction—once the dynamic transaction card enters a payment mode—by establishing wireless connectivity with the mobile computing device.

7.1 Wireless Connectivity

In one implementation and as described in U.S. patent application Ser. No. 13/904,939, the dynamic transaction card executes Block S120 by attempting—through the wireless communication module—to establish a wireless connection with a computing device affiliated with the dynamic transaction card. For example, a unique wireless address corresponding to a mobile computing device (e.g., a smartphone) and previously linked to the dynamic transaction card can be stored in memory on the dynamic transaction card. In this example, in response to transition from an off state into a payment mode, the controller can trigger the wireless communication module to attempt to pair wirelessly (e.g., over Bluetooth) with a local computing device assigned the unique wireless address. If the unique wireless address is found and a wireless connection with the associated computing device successfully established, the controller can authorize use of the dynamic transaction card in a subsequent transaction. The dynamic transaction card can then execute Block S120, as described below, to receive a selection for a particular transaction method to emulate in a subsequent transaction in preparation for the transaction.

Figure 8:
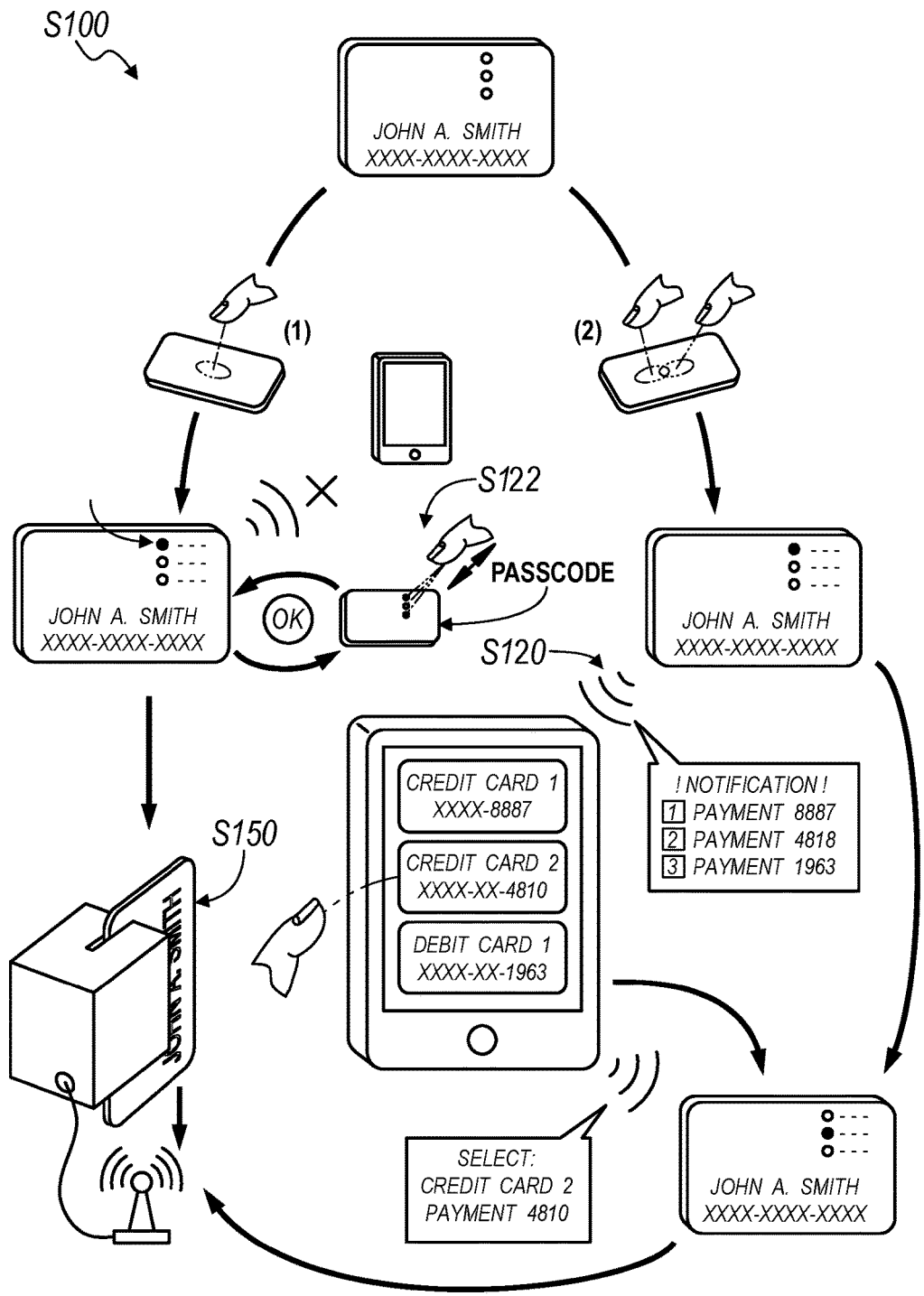
FIG. 8 is a flowchart representation of the method.

In a similar implementation, the dynamic transaction card is operable in a sleep mode (or other low-power state) when not in use and occasionally transitions into a test mode to check-in with the associated computing device to maintain authorization of use of the dynamic transaction card. For example, the dynamic transaction card can transition from the sleep mode into the test mode once per five-second interval (or at any other frequency or interval); once in the test mode, the wireless communication module within the dynamic transaction card can broadcast an inquiry for the unique wireless address of the mobile computing device affiliated with the dynamic transaction card. In this example, if a communication is received (wirelessly) from the mobile computing device in response to transmission of the inquiry (e.g., within 500 milliseconds of transmitting the inquiry), the dynamic transaction card can preserve authorization of its use and transition back into the sleep mode. However, in this example, if a communication is not received from the mobile computing device within a threshold period of time (e.g., 500 milliseconds) of transmitting the inquiry, the dynamic transaction card can transition into a locked state (or reattempt wireless communication with the mobile computing device by transmitting a second inquiry before transitioning into the locked state) in which emulation of a transaction method by the dynamic transaction card in a subsequent transaction is disabled, such as until a passcode is entered into and authenticated at the dynamic transaction card or until a wireless connection is again established with the mobile computing device, as shown in FIG. 8. Therefore, in this implementation, the dynamic transaction card can preserve authorization of its use until a scheduled check-in with the affiliated mobile computing device fails to yield a viable wireless connection with the mobile computing device. Alternatively, the dynamic transaction card can execute Block S120 to establish a (constant) wireless connection with the mobile computing device, to authorize its use in a subsequent transaction while the wireless connection persists, and to disable its use (e.g., disable emulation of a transaction method) when the wireless connection fails or is lost.

Thus, in the foregoing implementations, if the dynamic transaction card succeeds in establishing a wireless connection with a particular (e.g., paired) mobile computing device, the controller can confirm that the dynamic transaction card is sufficiently near (e.g., within a threshold authentication range of) the mobile computing device, which may indicate that an owner of the mobile computing device—who is also an owner of the dynamic transaction card—is within a suitable proximity to the dynamic transaction card. The controller can thus execute Block S120 to authenticate use of the dynamic transaction card in a subsequent transaction accordingly.

7.2 Wireless Connectivity Failure

However, in the foregoing implementation, if the wireless communication module of the dynamic transaction card fails to establish a wireless connection with the mobile computing device, the controller of the dynamic transaction card can enter an inactive mode and/or delete the token and any other transaction account information associated with the transaction method from the dynamic transaction card. Generally, the dynamic transaction card can execute Blocks of the method S100 to limit unauthorized use of the dynamic transaction card when separated from the mobile computing device.

In one implementation, in response to disconnection or disruption of the wireless connection, the dynamic transaction card can delete the token from local memory. For example, due to separation of the dynamic transaction card from the mobile computing device beyond a threshold distance or other aberrant function of the wireless module of the dynamic transaction card or the mobile computing device, the dynamic transaction card can delete the token and other transaction account information (e.g., the graphical representation of the transaction method described above) from local memory of the dynamic transaction card immediately succeeding disruption of the wireless connection. Alternatively, the controller can delete the token and/or other transaction account information from local memory after a threshold duration of time (e.g., three minutes) following disruption of the wireless connection. In this implementation, the mobile computing device can maintain the token in local memory of the mobile computing device, if present. Thus, the dynamic transaction card can be configured to prevent unauthorized use of the dynamic transaction card when separated from the mobile computing device.

Alternatively, as described below, the dynamic transaction card can enter an inactive or low-power state in response to failure of the wireless connection between the dynamic transaction card and the mobile computing device. In this implementation, the controller can temporarily disable the magnetic stripe emulator and ignore inputs to a surface of the dynamic transaction card while intermittently querying the wireless communication at a sampling interval (e.g., every ten seconds for two minutes) to confirm absence of the wireless connection with the dynamic transaction card. In response to detecting reestablishment of the wireless connection between the dynamic transaction card and the mobile computing device, the controller can enter an active mode in which the controller receives and responds to inputs on the surface of the dynamic transaction card, such as by switching between preloaded transaction methods.

However, the dynamic transaction card and the mobile computing device can restrict access and transmission of tokens and other transaction account information in any other way to limit unauthorized use of the dynamic transaction card when separated from the mobile computing device.

7.3 Passcode

Additionally or alternatively, as shown in FIG. 8, if the wireless communication module of the dynamic transaction card fails to establish a wireless connection with the mobile computing device, the controller of the dynamic transaction card can prompt the user to enter a passcode as a backup authentication method in Block S122. Generally, the dynamic transaction card can request a passcode to override security measures inhibiting function of the dynamic transaction card in the absence of the mobile computing device.

For example, the controller can trigger a visual indicator (e.g., an LED lamp) within the dynamic transaction card to signal to the user failure to authenticate use of the dynamic transaction card (e.g., by flashing the LED lamp) though wireless communication with the affiliated mobile computing device and to thus prompt the user to enter a passcode (e.g., a three or four tap sequence applied to a surface of the dynamic transaction card) into the dynamic transaction card to manually authenticate use of the dynamic transaction card. In this implementation, the controller can sample (e.g., poll) one or more input regions on the dynamic transaction card to detect a sequence of inputs onto the dynamic transaction card, and the controller can authenticate use of the dynamic transaction card if the sequence of inputs (e.g., a sequence of taps to the surface of the dynamic transaction card) matches a passcode stored on the dynamic transaction card, such as described in U.S. patent application Ser. No. 13/904,939.

Alternatively, the controller can execute Block S120 to transition into the payment mode in response to receiving an authenticated passcode sequence onto a surface of the dynamic transaction card.

However, the dynamic transaction card can implement Block S120 in any other way to authenticate use of the dynamic transaction card in a subsequent transaction, such as automatically based on proximity of the dynamic transaction card to a paired mobile computing device or based on a passcode entered manually into the dynamic transaction card, in response to entry of the dynamic transaction card into the payment mode.

7.4 Timing

Alternatively, the local token generator can generate a first token including a time stamp. Upon receipt of the token from the local token generator, the dynamic transaction card can initiate a timer (e.g., 2 minutes) during which the first token is active. Prior to expiration of the timer, the dynamic can generate a first magnetic stripe sequence command representing the first token and emulate the first magnetic stripe sequence command in response to detecting a magnetic stripe reader proximal the magnetic stripe emulator. Upon expiration of the timer, the dynamic transaction card can delete the first token and the first magnetic stripe sequence command from local memory.

8. Modes & Inputs

In one implementation, the dynamic transaction card wakes from a sleep state in response to an input (e.g., a tap) on a surface of the dynamic transaction card. In this implementation, the dynamic transaction card can trigger a piezoelectric circuit integrated in the dynamic transaction card to output a signal of sufficient voltage to trigger the controller within the dynamic transaction card to wake. The dynamic transaction card then executes Blocks of the method S100 to authorize its use and retrieves from memory a selection for a default transaction method. The dynamic transaction card then pairs a token for the default transaction method, received from a token generator, with a cryptogram preloaded onto the dynamic transaction card (or generates a cryptogram as described below) in preparation for use of the dynamic transaction card. (Alternatively, the dynamic transaction card can pair the token and the cryptogram substantially in real-time as the token is downloaded to the dynamic transaction card and as the dynamic transaction card is tapped on a wireless transaction reader or swept through a magnetic stripe card reader.)

The dynamic transaction card can alternatively receive a selection for a transaction method through selection of a corresponding input region on a surface of the dynamic transaction card. Yet alternatively, the dynamic transaction card can receive a selection for a transaction method from the mobile computing device wirelessly connected to the dynamic transaction card, such as described in U.S. patent application Ser. No. 14/542,092.

For example, the controller of the dynamic transaction card can transition the dynamic transaction card from a low-power state (i.e., inactive mode) into a payment mode in response to detecting a signal, output by a piezoelectric transducer arranged within the dynamic transaction card, that exceeds a preset threshold magnitude. In this example, the piezoelectric transducer can be configured to output a signal of magnitude corresponding to a degree of deflection of the dynamic transaction card out of a plane defined by a surface of the dynamic transaction card. Thus, in response to deflection of the dynamic transaction card before a preset deflect, such as by a user preparing for a transaction, the dynamic transaction card can enter an active mode, wherein the controller is prepared to generate magnetic stripe sequence commands from transaction account information and drive the magnetic stripe emulator according to a magnetic stripe sequence command.

Likewise, the controller of the dynamic transaction card can transition the dynamic transaction card from an active (e.g., payment) mode to an inactive (e.g., low-power) mode in response to detecting an input proximal or coincident the dynamic transaction card.

However, the dynamic transaction card can execute Blocks of the method S100 to intermittently transition between active and inactive modes in response to inputs to the dynamic transaction card.

9. Multiple Transaction Methods

Figure 5:
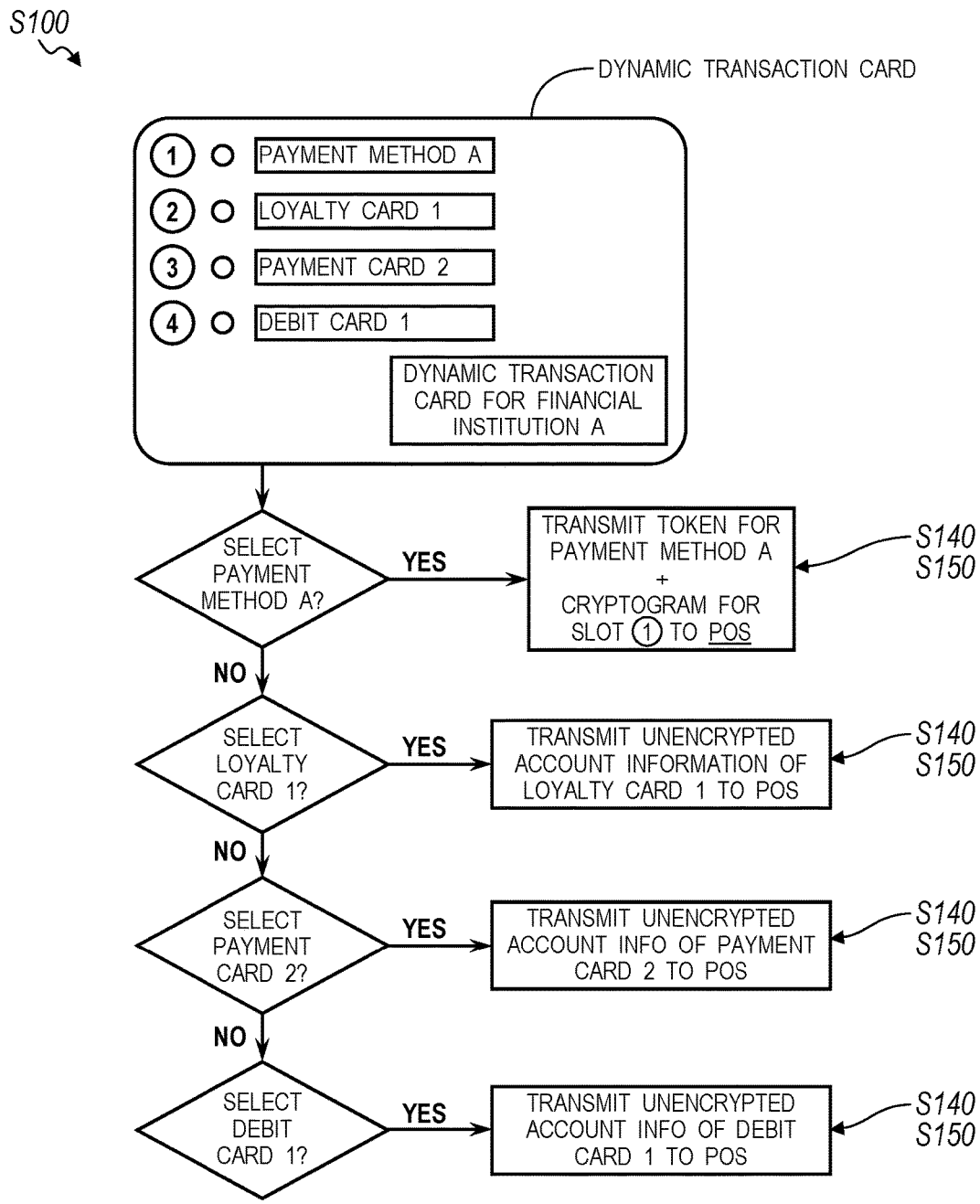
FIG. 5 is a flowchart representation of the method.
Figure 10:
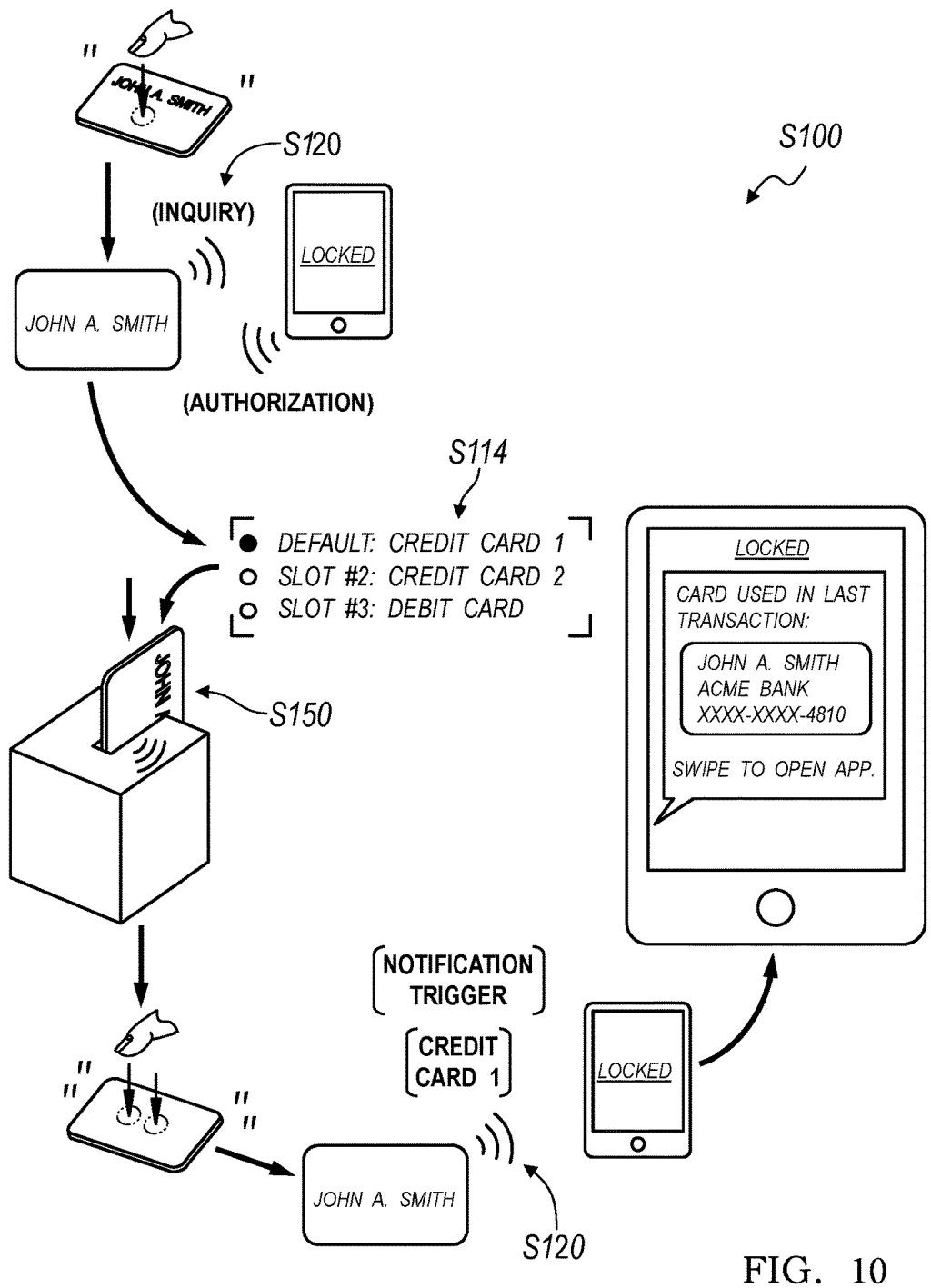
FIG. 10 is a flowchart representation of the method.

Additionally, as shown in FIGS. 5 and 10, the dynamic transaction card can execute Blocks of the method S100 to receive, store, and selectively emulate multiple transaction methods through the (singular) dynamic transaction card. Generally, the dynamic transaction card can load a set of (varied and discrete) transaction methods to allocated memory of the dynamic transaction card and, in response to selection of a particular transaction method, drive the magnetic stripe emulator to selectively emulate a magnetic stripe sequence command corresponding to the particular transaction method while maintaining the other transaction methods in local memory of the dynamic transaction card.

As described above, the dynamic transaction card can associate particular transaction methods with input regions arranged on a surface of the dynamic transaction card such that upon selection of a particular input region, the dynamic transaction card can drive the magnetic stripe emulator to emulate a particular transaction method. For example, the dynamic transaction card can store a first payment method in local memory and associate the first payment method with a first input button on a surface of the dynamic transaction card. In response to detecting an input coincident the first input button (e.g., depression of or detected touch coincident the first input button into the dynamic transaction card), the dynamic transaction card can select the first payment method, generate a first magnetic stripe sequence command corresponding to the first payment method, and drive the magnetic stripe emulator to emulate the first magnetic stripe sequence command. Similarly, in response to detection of a second input coincident (or proximal) the second input button, the dynamic transaction card can select a second payment method and drive the magnetic stripe emulator to emulate a second magnetic stripe sequence command previously generated by the dynamic transaction card for the second payment method.

Additionally, in response to detecting a second input coincident (or proximal) a second input region succeeding the first input, the dynamic transaction card can select a second transaction method to emulate during an subsequent transaction at the dynamic transaction card and generate a second magnetic stripe sequence command according to the second transaction method in preparation for this upcoming transaction.

9.1 Single Encrypted+Multiple Unencrypted Transaction Methods

In one implementation shown in FIG. 5, the dynamic transaction card can load an encrypted transaction method and a set of unencrypted transaction methods to local memory and selectively emulate the encrypted transaction and each transaction method in the set of unencrypted transaction methods in response to selection. Generally, the dynamic transaction card can selectively download and emulate both encrypted transaction methods processed through concurrent transmission of cryptograms and tokens and unencrypted transaction methods processed through transmission of raw, unencrypted account information.

In particular, as described above, the dynamic transaction card can store and emulate cryptograms and tokens of encrypted transaction methods (e.g., virtual credit cards) issued from a financial institution sponsoring production of the dynamic transaction card. To exploit the dynamic capability of the magnetic stripe emulator of the dynamic transaction card, the dynamic transaction card can also accept, store, and emulate additional transaction methods; however, the additional transaction methods can be emulated by the magnetic stripe emulator according to magnetic stripe sequence commands corresponding to raw, unencrypted transaction information without tokens and cryptograms.

For example, in response to selection of the first encrypted transaction method (e.g., a virtual credit card), the dynamic transaction card can: generate or access a first magnetic stripe sequence command corresponding to (e.g., communicating) the cryptogram and the token representing the first transaction method; and prepare the magnetic stripe emulator to drive the magnetic stripe emulator according to the first magnetic stripe sequence command. Therefore, in response to detecting a magnetic stripe card reader proximal the dynamic transaction card, the controller can drive the magnetic stripe emulator according to the first magnetic stripe sequence command, thereby transmitting the cryptogram and the token of the first transaction method to the magnetic stripe card reader at a POS system. As described above, the POS system can then transmit the cryptogram, the token, and transaction information (e.g., payment amount requested and location of the transaction) to a payment issuer affiliated with a financial institution hosting the transaction method. Subsequently, in response to concurrent receipt of the cryptogram and the token, the payment issuer may issue payment to the merchant, to authorize the transaction. However, in response to selection of a second transaction method in the set of unencrypted transaction methods, the dynamic transaction card can: generate or access a second magnetic stripe sequence command corresponding to unencrypted transaction account information, such as credit card numbers, account holder name, account holder address, etc. in lieu of a cryptogram and a token. In response to selection of a second transaction method, the controller of the dynamic transaction card can drive the magnetic stripe emulator according to the second magnetic stripe sequence command, thereby transmitting the unencrypted transaction account information of the second transaction method to the magnetic stripe card reader at a POS system.

In one variation of the foregoing implementation shown in FIG. 10, the dynamic transaction card can default to the first encrypted transaction method in the absence of an explicit selection of the second (unencrypted) transaction method in Block S114. Generally, in this variation, the dynamic transaction card can be configured to maintain high encryption and security of transaction methods emulated by the dynamic transaction card by default unless an alternate (unencrypted) transaction method is purposefully selected for emulation. For example, the dynamic transaction card can drive the magnetic stripe emulator according to the first magnetic stripe sequence command, corresponding to the cryptogram and the token associated with the first encrypted transaction method, by default (in lieu of selection of a different transaction method). However, in response to selection of an input region of the dynamic transaction card assigned to the second transaction method, the dynamic transaction card can drive the magnetic stripe emulator according to the second magnetic stripe sequence command, corresponding to the unencrypted account information of the second transaction method.

Figure 11:
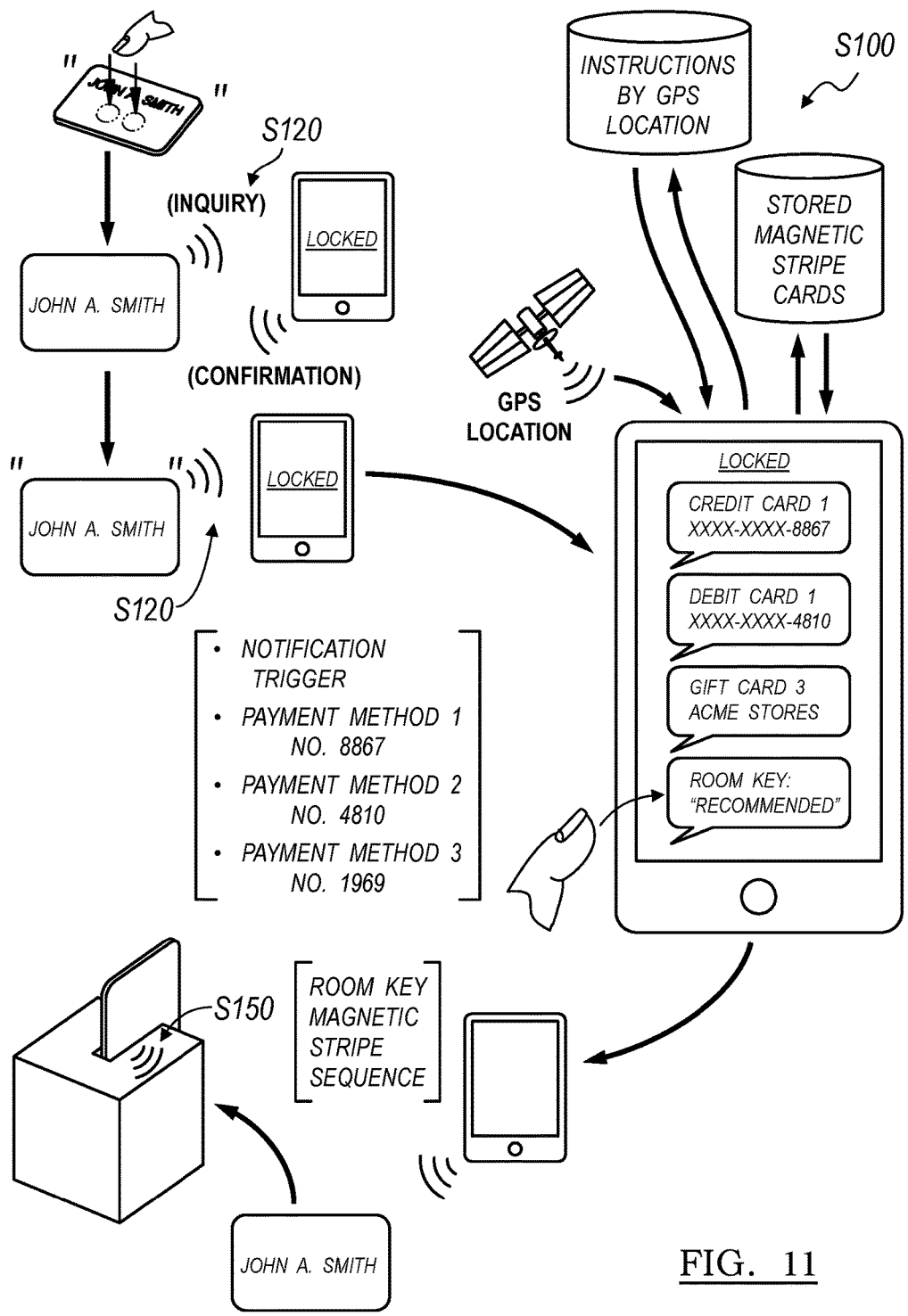
FIG. 11 is a flowchart representation of the method.

In the foregoing variation shown in FIG. 11, the second (unencrypted) transaction method can correspond to lower security transaction methods, such as lower security credit cards and debit cards (e.g., affiliated with a financial institution other than the financial institution sponsoring manufacture of the dynamic transaction card), gift cards, loyalty program cards, etc. For example, the second (unencrypted) transaction method can correspond to a loyalty account associated with a loyalty rewards program. In this implementation, the native application can receive loyalty account information and transmit the loyalty account information to the dynamic transaction card for local storage. The dynamic transaction card can thus generate a second magnetic stripe sequence command corresponding to the unencrypted loyalty account information. Alternatively, the dynamic transaction card can download the second magnetic stripe sequence command for the second (unencrypted) transaction method directly from the mobile computing device or an external (remote) server. In this example, in response to selection of the second transaction method, such as by depression of an input region assigned to the second transaction method, and in response to detecting a magnetic stripe card reader proximal the dynamic transaction card, the controller of the dynamic transaction card can drive the magnetic stripe emulator according to the second magnetic stripe sequence command.

Additionally or alternatively, the dynamic transaction card can select the second transaction method (and/or the first transaction method) based on relevance of the second transaction method at a current location of the dynamic transaction card. Generally, in this implementation, the dynamic transaction card can be configured to default to emulate a first (encrypted) transaction method unless a second transaction method is more relevant or financially advantageous to the user under current conditions.

Figure 12:
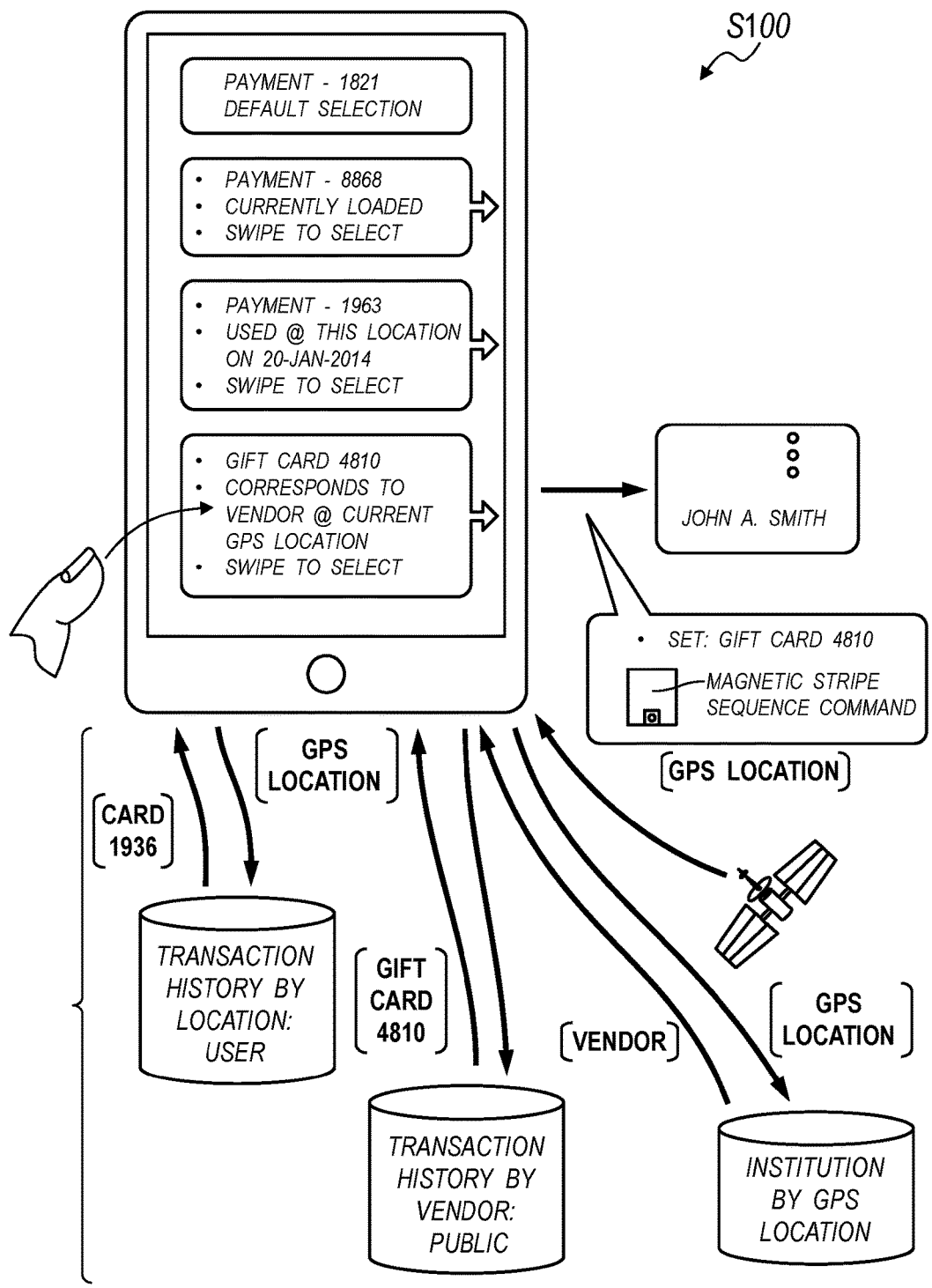
FIG. 12 is a flowchart representation of the method.

In particular, the user may belong to a loyalty rewards program for a particular merchant or hold a merchant-sponsored credit card account affiliated with the particular merchant. During transactions at the particular merchant, in response to employing the loyalty rewards program or the merchant-sponsored credit card rather than an alternative, unaffiliated transaction method, the merchant may reward the user with discounts, rewards points, loyalty gifts, etc. As shown in FIGS. 11 and 12, to incentivize transactions employing merchant-affiliated transaction methods during transactions at the particular merchant, the dynamic transaction card can, thus, automatically select relevant merchant-affiliated transactions methods, instead of the default, encrypted transaction method, based on a current location of the dynamic transaction card. For example, the dynamic transaction card can request and receive the current location from the mobile computing device. Based on the current location, the dynamic transaction card can select a transaction method corresponding to a loyalty account relevant (i.e., applicable) to the current location and, thus, drive the magnetic stripe emulator according to a second magnetic stripe sequence command corresponding to the loyalty account.

9.2 Multiple Encrypted Transaction Methods

In another implementation, the dynamic transaction card can be preloaded with multiple static cryptograms. Generally, in this implementation, the dynamic transaction card can store and emulate multiple encrypted transaction methods by pairing encrypted tokens representing transaction methods with (encrypted) cryptograms representing a unique address within the dynamic transaction card.

In particular, in this implementation, an external cryptogram generator, such as a dynamic transaction card issuer, may preload the dynamic transaction card with a group of cryptograms and supply a log (or registry) of the group of cryptograms to a financial institution affiliated with the dynamic transaction card issuer. Upon receipt of the dynamic transaction card, the user may pair the dynamic transaction card with the mobile computing device, thereby informing the financial institution that the (particular) dynamic transaction card including the (particular) group of cryptograms corresponds to the (particular) user affiliated with the (particular) mobile computing device. Thus, the native application of the mobile computing device can load a set of tokens representing a set of transaction methods affiliated with the (particular) user. The dynamic transaction card can download—in real-time, sequentially, or asynchronously—the set of tokens from the mobile computing device and store the tokens in local memory. Additionally, the dynamic transaction card can pair each token in the set of tokens with a cryptogram in the group of cryptograms. Thus, the dynamic transaction card can generate a set of magnetic stripe sequence commands representing each token and cryptogram pair and, thus, representing each encrypted transaction method. In response to detecting a magnetic stripe card reader proximal the dynamic transaction card and in response to selection of a particular transaction method, the dynamic transaction card can drive the magnetic stripe emulator to output a particular magnetic stripe sequence command corresponding to the cryptogram and token pair representing the particular transaction method.

9.3 Dynamic Cryptogram Generator

Based on a selection for the particular transaction method from the set of transaction methods, generating a cryptogram corresponding to the particular transaction method. Generally, the dynamic transaction card can, in response to an input on a surface of the dynamic transaction card, generate a one-time-use cryptogram (or authorization code, etc.) for transmission in an upcoming transaction.

Once selection of a transaction method is made or received at the dynamic transaction card (and/or one a transaction with the transaction method is initiated), the dynamic transaction card can trigger the cryptogram generator to output a one-time-use cryptogram for the transaction. The cryptogram generator can be generic to all tokenized transaction methods emulated at the dynamic transaction card. Alternatively, the dynamic transaction card can host multiple cryptogram generators, such as one substantially unique cryptogram generator per transaction method loaded onto the dynamic transaction card, and the dynamic transaction card can thus trigger a particular cryptogram generator—relevant to a particular transaction method selected for an upcoming transaction—to output a cryptogram for the upcoming transaction. For example, the dynamic transaction card can download a transaction package for a transaction method from the dynamic transaction card, the transaction package including both a static token and a corresponding cryptogram generator specific to the transaction method.

Therefore, in one implementation, the dynamic transaction card is pre-loaded with multiple cryptogram generators (e.g., "secret keys" for generating different varieties of cryptograms). In this implementation, the various cryptogram generators can execute corresponding cryptographic schemes, and the dynamic transaction card can thus emulate various transaction methods through various tokens schemes and various corresponding cryptographic schemes hosted by various token generators.

In another implementation, the dynamic transaction card is not pre-loaded with a cryptogram generator. Rather, once the user takes receipt of the dynamic transaction card and the dynamic transaction card is linked to the user's computing device, the native application executing on the user's computing device retrieves an encrypted cryptogram generator (e.g., a cryptogram scheme) from a service provider and uploads the encrypted cryptogram generator to the dynamic transaction card. The dynamic transaction card then decrypts the encrypted cryptogram generator during a transaction with the dynamic transaction card. In this implementation, the dynamic transaction card can thus receive and execute new cryptographic "profiles" over time (e.g., after the dynamic transaction card is issued into the field), thereby enabling greater token service support. Furthermore, in this implementation, the dynamic transaction card can thus be shipped to a user devoid of secure content, and the native application—executing on the user's computing device—can upload secure content (e.g., cryptographic protocols, tokens, etc.) to the dynamic transaction card once the dynamic transaction card is linked to and wireless connected to the user's computing device.

However, the dynamic transaction card can generate a cryptogram for a transaction method selected for an upcoming transaction in any other way.

10. Magnetic Stripe Sequence Command

Figure 9:
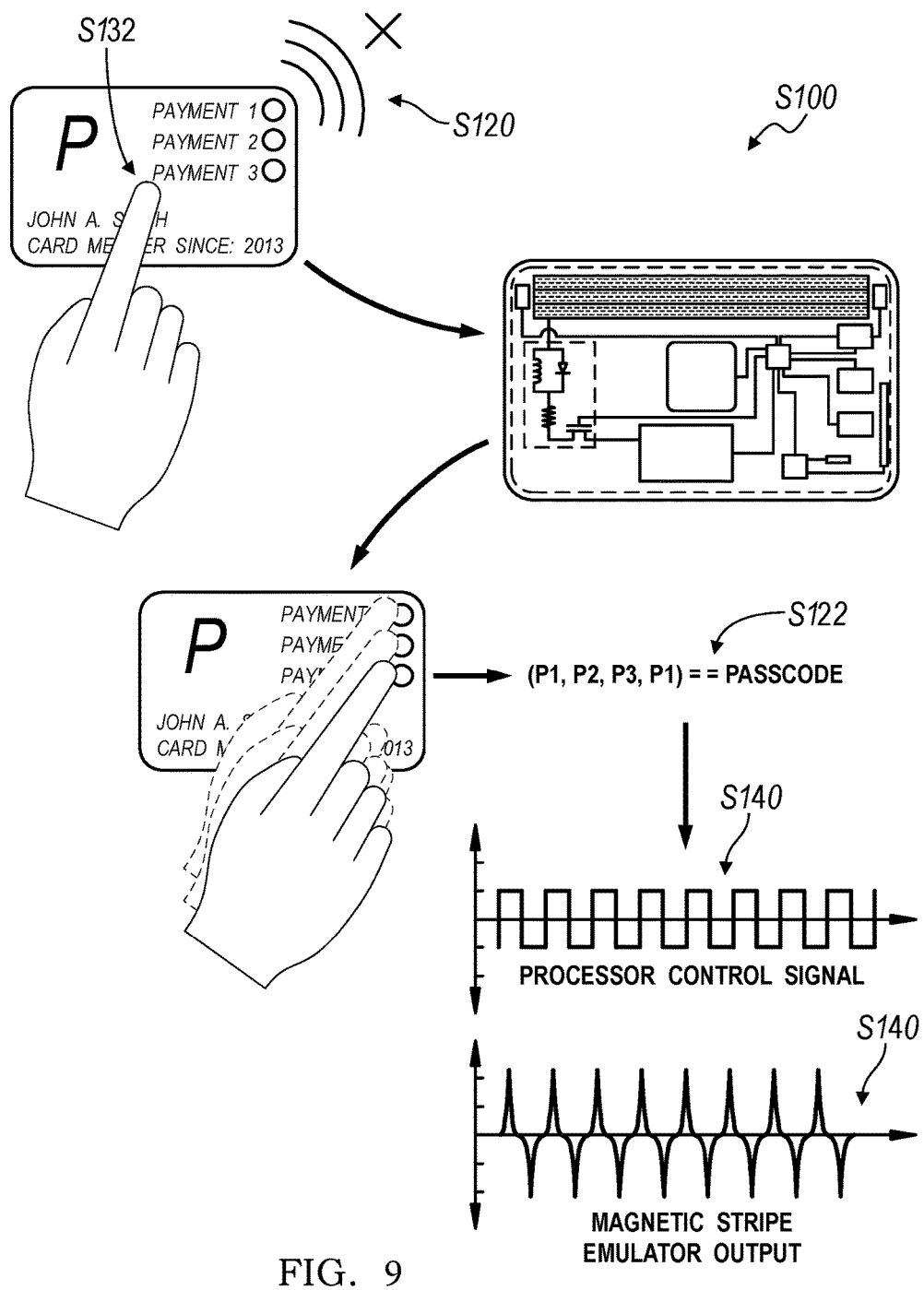
FIG. 9 is a flowchart representation of the method.

As shown in FIG. 9, Block S140 of the method S100 recites generating a first magnetic stripe sequence command representing the first cryptogram and the first token. Generally, the dynamic transaction card can execute Block S140 of the method S100 to transform the cryptogram and the token associated with a particular transaction method into a magnetic stripe sequence command configured to drive the magnetic stripe emulator to emulate a magnetic stripe sequence corresponding to and transmitting the cryptogram and the token to a POS.

As described above, the dynamic transaction card (or an external magnetic stripe sequence command generator) can generate a magnetic stripe sequence command corresponding to account information and/or a token and a cryptogram representing account information of a particular transaction method.

In one example implementation, the dynamic transaction card can download and store a first bitstring representing a cryptogram and a second bitstring representing a token. For example, the first bitstring can include thirty-two bits and the second bitstring can include sixteen-bits representing an encrypted form of a credit card number. Thus, in this example implementation, the dynamic transaction card can generate a comprehensive bitstring representing both the token and the cryptogram by compiling the first and second bitstrings in series, in parallel, or in any other order. From the comprehensive bitstring, the controller can generate a magnetic stripe sequence command directly corresponding to the comprehensive bitstring.

Furthermore, the controller can prepend the comprehensive bitstring with a swipe initiation sequence and append the comprehensive bitstring with a swipe termination sequence. Thus, the dynamic transaction card can generate a magnetic stripe sequence command including an initiation sequence indicating to a magnetic stripe card reader where, during a swipe, the magnetic stripe card reader can read important transaction information relayed by the magnetic stripe sequence emulated by the magnetic stripe emulator. Likewise, the dynamic transaction card can generate the magnetic stripe sequence command to include a termination sequence indicating where the important transaction information terminates.

However, the dynamic transaction card can generate and/or access the magnetic stripe sequence command in any other suitable way.

10.1 Emulation: Wireless Transaction

At the radio-frequency wireless transmitter, broadcasting the cryptogram and a form of a token corresponding to the particular transaction method in response to detection of a wireless transaction reader proximal the dynamic transaction card.

Generally, the dynamic transaction card can broadcast a variety of data sufficient to complete a transaction with the selected transaction method—such as the corresponding token, token expiry date, cryptogram, etc.—to a wireless transaction reader detected near the dynamic transaction card, as shown in FIG. 2.

In one implementation, the dynamic transaction card assembles a transaction packet including a token, a token expiry date, a cryptogram, etc. and other chip data elements corresponding to a selected transaction method in response to activation of the dynamic transaction card and/or selection of the transaction method for an upcoming transaction, and the radio-frequency wireless transmitter (or other wireless communication module) within the dynamic transaction card broadcasts the transaction packet over short-range wireless communication protocol (e.g., NFC) in response to receipt of a transaction request from an adjacent wireless transaction reader within a merchant's POS system terminal.

10.2 Emulation: Magnetic Stripe

Blocks S140 and S150 of the method S100 recite: generating a first magnetic stripe sequence command representing the first cryptogram and the first token in Block S140; and in response to detecting a magnetic stripe card reader proximal a magnetic stripe emulator integrated into the dynamic transaction card at a third time succeeding the second time, driving the magnetic stripe emulator according to the first magnetic stripe sequence command in S150. Generally, the dynamic transaction card can execute Blocks S140 and S140 to transmit transaction data for the selected transaction method—via the magnetic stripe emulator—to a magnetic stripe card reader within a merchant's POS system terminal, as shown in FIG. 2.

In particular, the dynamic transaction card can emulate the selected transaction method by selectively transmitting the corresponding token and cryptogram over radio-frequency wireless communication or via the magnetic stripe emulator based on detected proximity of a wireless transaction reader or detected proximity of a magnetic stripe card reader, respectively, to the dynamic transaction card. For example, the dynamic transaction card can sample one or more integrated magnetic stripe card reader sensors within the dynamic transaction card to detect an adjacent magnetic stripe card reader, can drive the magnetic stripe emulator according to a magnetic stripe sequence command corresponding to the selected transaction method in Block S140 if a magnetic stripe card reader is detected. (The dynamic transaction card can also broadcast the token and cryptogram for the selected transaction method (and disable the magnetic stripe emulator) if a transaction request is received from a wireless transaction reader, as described above).

In one implementation, the dynamic transaction card emulates a static magnetic stripe sequence command output by a static transaction method (e.g., a static credit card, a static debit card) by driving one or more tracks within the magnetic stripe emulator according to a corresponding magnetic stripe sequence command. For example, the mobile computing device can interface with a magnetic stripe card reader to read an output of the transaction method (e.g., a credit card, a debit card) and then generate a magnetic stripe sequence command based on magnetic fields reader from the transaction method; the dynamic transaction card then downloads the magnetic stripe sequence command and drives one or more tracks within the magnetic stripe emulator accordingly when the dynamic transaction card is swept through a magnetic stripe card reader. In this implementation, in Blocks S140 and S150, the dynamic transaction card can drive a first track (e.g., Track 1) of the magnetic stripe emulator according to the magnetic stripe sequence command generated for the token and also drive a second track (e.g., Track 2) within the magnetic stripe emulator according to a magnetic stripe sequence command generated for the cryptogram substantially simultaneously as the dynamic transaction card is swept through a magnetic stripe card reader. In this implementation, the magnetic stripe card reader (in a merchant's POS) can thus pass a form of the token and the cryptogram from the dynamic transaction card to an acquirer (i.e., a merchant hosting a POS) and on to a payment network for authentication. The payment network can then cooperate with an issuer of the transaction method and the token service provide authenticate the transaction based on the magnetic stripe sequence command representing the token and the cryptogram, as shown in FIG. 2.

In another implementation, the dynamic transaction card generates a one-time-user magnetic stripe sequence command based on the token and the cryptogram generated for the transaction. For example, the dynamic transaction card can execute Block S140 to generate a Track 1 (Format B) magnetic stripe sequence command including the token, the cryptogram, an expiration date of the token, and a service code. In this example, the dynamic transaction card can set the token in place of a primary account number (PAN) in a Format B magnetic stripe sequence command and can set the cryptogram in place of a PIN Verification Value (PVV) in the Format B magnetic stripe sequence command to generate a command for Format B magnetic stripe sequence command including: a start sentinel, a format code, a PAN (now the token), a first field separator, a name field (blank), a second field separator, an expiration date (the expiration date of the token), a service code (e.g., including a pointer to the token generator), a PVV (now the cryptogram), and an end sentinel. The dynamic transaction card can thus output the one-time-use Format B magnetic stripe sequence command—via the magnetic stripe emulator—in Block S150 when the dynamic transaction card is swept through a magnetic stripe card reader.

However, the dynamic transaction card can emulate a selected transaction method through the magnetic stripe emulator in Blocks S140 and S150, respectively, in any other suitable way.

As described below, the dynamic transaction card can also incorporate one or more chip pin pads, and the dynamic transaction card can additionally or alternatively similarly emulate a selected transaction method via all or a subset of the chip pin pads (e.g., based on a type or contact-based transaction method being emulated), as described above. In this variation, the dynamic transaction card can thus emulate various difference types of transaction chips by transmitted tokenized transaction data through one or more chip pin pads integrated into the dynamic transaction card.

11. Post Transaction

In one implementation, immediately following emulation of the magnetic stripe sequence command by the magnetic stripe emulator (and/or passage of the magnetic stripe emulator through a magnetic stripe card reader), the dynamic transaction card can initiate a timer over which the controller is active and prepared to drive the magnetic stripe emulator according to the magnetic stripe sequence command in response to detecting proximity of a magnetic stripe card reader to the dynamic transaction card. Generally, upon expiration of the timer following an instance of emulation of the magnetic stripe sequence command by the magnetic stripe emulator, the dynamic transaction card can enter an inactive (or "sleep") mode in which the magnetic stripe emulator is inoperable until the dynamic transaction card is explicitly activated, such as by an input to the surface of the dynamic transaction card. Furthermore, while the timer is active, the controller can continue to drive the magnetic stripe emulator according to the magnetic stripe sequence command. Thus, in this implementation, to secure the card after use, the dynamic transaction card can configure the timer to limit a duration of time (and, thus, a number of swipes) after activation and emulation that the dynamic transaction card can emulate a transaction method.

In this implementation, while the timer is active, the controller can intermittently look for the magnetic stripe card reader proximal the magnetic stripe emulator at a sampling interval (e.g., every 0.1 ms). In response to detection of the magnetic stripe card reader proximal the magnetic stripe card reader prior to expiration of the timer, the controller can continue to drive the magnetic stripe emulator according to the magnetic stripe sequence command. However, after expiration of the time, the dynamic transaction card can disable the magnetic stripe emulator.

11.1 Delete Token

Furthermore, in response to confirmation of emulation of a particular magnetic stripe sequence command corresponding to a transaction method represented by a token and a cryptogram, the dynamic transaction card can delete the token from local memory at the native application and/or at the dynamic transaction card while maintaining the cryptogram. Furthermore, the dynamic transaction card can delete the magnetic stripe sequence command from local memory at the dynamic transaction card. Generally, in this implementation, the dynamic transaction card can be configured to limit local storage of sensitive transaction account information by deleting the sensitive transaction account information following use.

Alternatively, following emulation of the magnetic stripe sequence command, the dynamic transaction card can, as described above, initiate a timer. While the timer is active, the dynamic transaction card can maintain the token and/or the magnetic stripe sequence command in local memory of the dynamic transaction card. After expiration of the timer, the dynamic transaction card can purge the token and the magnetic stripe sequence command from local memory.

11.2 Output Secondary Transaction Method

Figure 6:
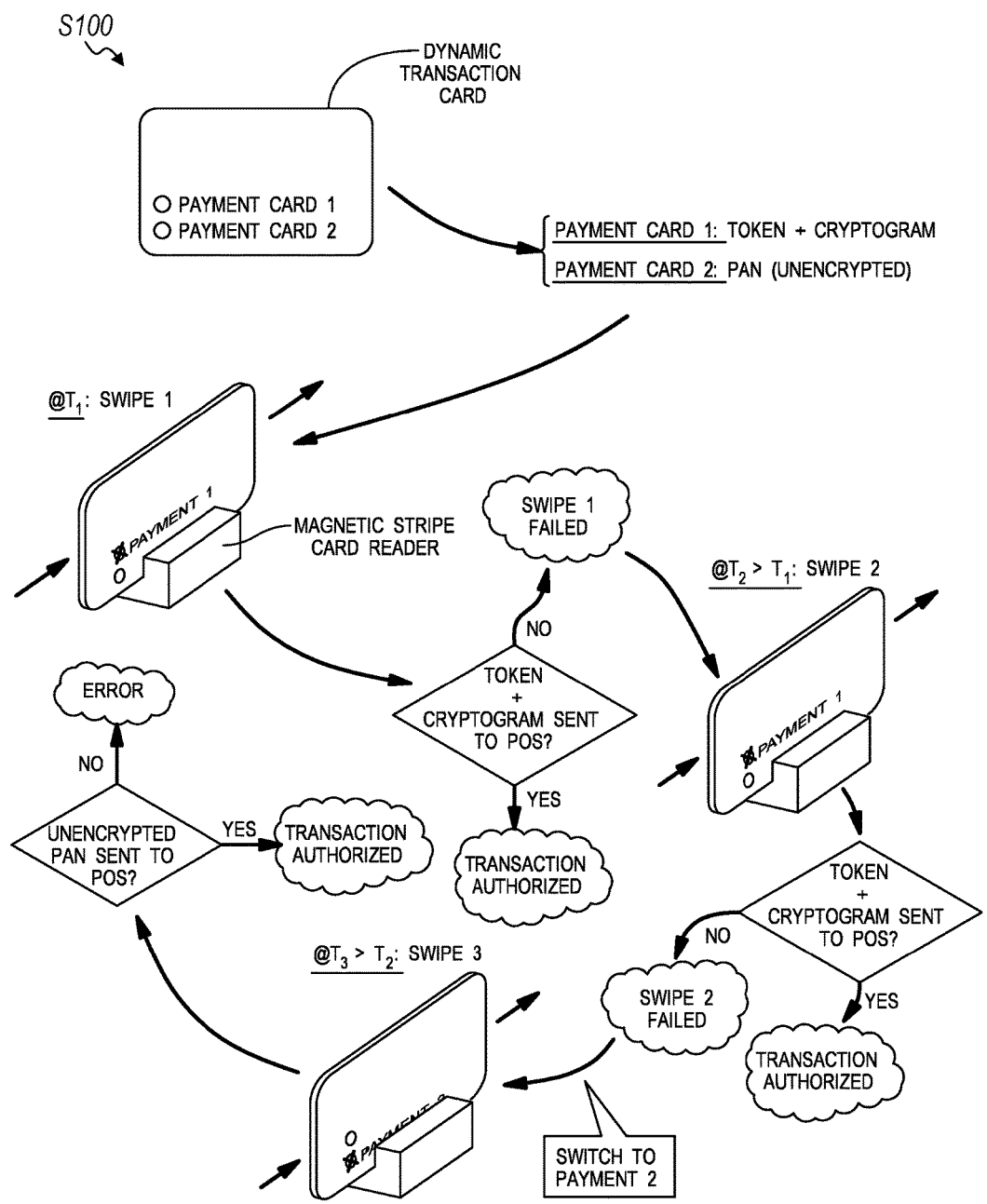
FIG. 6 is a flowchart representation of the method.

As described above and shown in FIG. 6, the dynamic transaction card can emulate multiple transaction methods—encrypted and unencrypted. In one implementation, the dynamic transaction card can detect multiple successive swipes of the dynamic transaction card through a magnetic stripe card reader within a threshold period of time; and switch transaction methods and sequentially reduce encryption strength with each successive swipe. Generally, in this implementation, the dynamic transaction card can be configured to switch transaction methods in response to triggers indicating failure (i.e., non-acceptance) of a particular transaction method at a POS system.

In particular, at a first time, the dynamic transaction card can detect a magnetic stripe card reader proximal the magnetic stripe emulator during a first swipe through the magnetic stripe card reader integrated into a POS system and drive the magnetic stripe emulator according to a first magnetic stripe sequence command corresponding a first cryptogram and a first token representing a (default) first transaction method. However, at a second time succeeding the first time and within a preset duration of the first time (e.g., 3 seconds), the detect can detect initiation of second swipe of the dynamic transaction card through the magnetic stripe card reader. In response to initiation of the second swipe, the dynamic transaction card can flag the first swipe as an ineffective swipe (e.g., due to a failure of the magnetic stripe card reader). Thus, the dynamic transaction card can drive the magnetic stripe emulator according to the (same) first magnetic stripe sequence command during the second swipe. If the dynamic transaction card detects no more swipes following the second swipe for a threshold duration of time (e.g., thirty seconds), the dynamic transaction card can mark the second swipe successful and disregard the first swipe as an ineffective miscommunication between the dynamic transaction card and the magnetic stripe card reader. However, if, at a third time, the dynamic transaction card detects initiation of a third swipe following the second swipe within the threshold duration of time, the dynamic transaction card can drive the magnetic stripe emulator according to a second magnetic stripe sequence command corresponding to unencrypted account information of a second transaction method. Furthermore, based on success third swipe (i.e., no additional swipe succeeding the third swipe for a threshold duration), the dynamic transaction card can determine that the POS system does not accept encrypted transactions without direct two-way communication between the POS system and the dynamic transaction card.

Additionally, in another implementation, the dynamic transaction card can record (POS system) locations where particular encryption protocols are successful and unsuccessful. Generally, the dynamic transaction card can cooperate with financial institutions to map encryption protocols of points of sales at various merchants in order to predict a successful encryption scheme for a transaction at a particular POS system prior to the transaction and, therefore, avoid multiple swipes.

In particular, the dynamic transaction card can in response to success of the first transaction described above, the native application executed by the mobile computing device can record a first location of the first transaction and associate the first location with acceptance of encrypted tokenized transactions (i.e., employing cryptograms and tokens). (The mobile computing device can access the first location of the mobile computing device through a GPS-module or other location-sensing module integrated into the mobile computing device). In response to failure of the first transaction and success of the second transaction, dynamic transaction card can similarly associate the first location of the first transaction with encrypted tokenized transactions. However, in response to failure of the second transaction and success of the third transaction wherein the magnetic stripe emulator emulates unencrypted transaction information, the native application can record a third location of the third transaction and associate the third location with acceptance of unencrypted transaction.

From the first and third locations, the native application, financial institutions, and other users of the other dynamic transaction cards can cooperate to define a (crowd-sourced map) identifying security preferences and encryption protocols of points of sale. Based on the map, the dynamic transaction card can preemptively select a transaction method for a particular location prior to a transaction, the transaction method including encryption protocols corresponding to known encryption protocols at the particular location. Thus, the dynamic transaction card can avoid sequential testing of various encryption protocols at every POS system for every transaction.

However, the dynamic transaction card and the mobile computing device can cooperate in any other suitable way to adapt to various encryption protocols of points of sale prior to transactions at said points of sale while maintaining the highest encryption level acceptable at each POS system during each transaction with the dynamic transaction card.

12. Replacement Payment Methods

As described above and shown in FIG. 7, Blocks of the method S100 can be implemented to facilitate replacement and renewal of transaction (or payment) methods by receiving new virtual transaction methods from a financial institution wirelessly over the wireless connection. Generally, Blocks of the method S100 can be implemented to securely replace a compromised virtual transaction method with a new virtual transaction method without requiring the financial institution to issue an entirely new physical card.

In particular, the financial institution may issue a (new) second payment method. In this implementation, the dynamic transaction card can store in local memory the first payment method represented by a first token and a first cryptogram. Thus, the native application can download, from the local (or external) token generator, a second token representing a second payment method associated with the financial account. Additionally, the native application and the dynamic transaction card can delete a first token representing the first payment method from local memory. Thus, the dynamic transaction card can download the second token to the dynamic transaction card via the wireless connection.

In one implementation, the dynamic transaction card can pair the second token with the first cryptogram, thereby maintaining a cryptogram and replacing a token to emulate a replacement payment method. In another implementation, the dynamic transaction card can pair the second token with a second cryptogram, thereby replacing both a cryptogram a token to emulate a replacement payment method for enhanced security in the event the first payment method was compromised.

The native application can download replacement transaction (or payment) methods in response to receipt of fraud detection related to the first payment method (e.g., a financial account hosted by the financial institution) from the financial institution. For example, the financial institution may detect aberrant activity of the first payment method at a location remote from the dynamic transaction card or the financial institution may detect unusual spending (e.g., excessively high) with first payment method. In response to detecting aberrant or unusual activity, the dynamic transaction card can issue a new payment method to the native application wirelessly. Furthermore, the financial institution may issue new payment methods periodically, such as every six months, for enhanced security.

Additionally or alternatively, the mobile computing device can receive and store PAN and other account information of a replacement transaction method in local memory of the mobile computing device prior to activation of the replacement transaction method at the financial institution. In response to establishing a wireless connection (i.e., "pairing") between the mobile computing device and the dynamic transaction card, the mobile computing device can transmit the replacement transaction method to the dynamic transaction card, thereby activating the replacement transaction method with the financial institution. Upon receipt of the replacement transaction method and activation of the replacement transaction method with the financial institution, the local token generator can generate a token representing the PAN of the replacement transaction method.

However, the native application and the financial institution can cooperate in another suitable way to issue replacement transaction methods in response to any other trigger. Additionally, the dynamic transaction card can update transaction methods stored in local memory to correspond with replacement transaction methods in any other suitable way.

13. EMV

In one variation of the method S100, the dynamic transaction card can also include an integrated EMV-chip (or other integrated chip-card circuit) configured to output a cryptogram and a token for a transaction method in response to insertion of the EMV-chip into a chip-card reader for a transaction.

In one example implementation, the dynamic transaction card can locally store a single encrypted transaction method in local memory. Thus, in response to detecting the EMV-chip proximal a chip-card reader, the EMV-chip can output a signal (i.e., emulate) corresponding to the cryptogram and the token representing the single encrypted transaction method.

Likewise, the dynamic transaction card can locally store a set of encrypted transaction methods, each encrypted transaction methods in the set of encrypted transaction methods represented by a unique token and a unique cryptogram. In response to detecting the EMV-chip proximal a chip-card reader and in response to selection of a particular encrypted transaction method from the set of encrypted transaction methods, the EMV-chip can output a signal corresponding to the unique token and the unique cryptogram.

15. Card-Not-Present Transaction

In one variation, the dynamic transaction card cooperates with the native application executing on the user's computing device to complete an online transaction through the mobile computing device. In one example, the user taps the dynamic transaction card three time to trigger the dynamic transaction card to enter an "online transaction mode," and the dynamic transaction card authenticates its use, as described above. In this example, the dynamic transaction card then executes generates a new cryptogram for an upcoming online transaction with a selected transaction method, packages the new cryptogram and a token corresponding to the selected transaction method, and transmits the cryptogram and token back to the mobile computing device; the native application then disseminates the cryptogram and token: to an other native application to complete a transaction within the other native application; into a webpage or other interface within a web browser executing on the mobile computing device; or directly to an acquirer with a tag identifying the online transaction initiated through another native application or web browser executing on the user's computing device. As in this example, the dynamic transaction card can thus authenticate a transaction with a transaction method hosted by the dynamic transaction card, such as by requiring a valid fingerprint scan at the dynamic transaction card and/or by requiring a wireless connection between the dynamic transaction card and an associated computing device (e.g., a smartphone), and the dynamic transaction card can selectively supply transaction data for a selected transaction method accordingly to enable secure "card-not-present" (e.g., online, remote) transaction.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a controller but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising, at a dynamic transaction card:
   at a first time, accessing a first cryptogram;
   at a second time, establishing a wireless connection with a mobile computing device;
   in response to establishing the wireless connection with the mobile computing device, accessing a first token associated with the first cryptogram;
   generating a first magnetic stripe sequence command representing the first token in place of a primary account number in the first magnetic stripe sequence command and representing the first cryptogram in place of a pin verification value in the first magnetic stripe sequence command; and
   in response to detecting a magnetic stripe card reader proximal a magnetic stripe emulator integrated into the dynamic transaction card at a third time succeeding the second time, driving the magnetic stripe emulator according to the first magnetic stripe sequence command.

2. The method of claim 1, wherein accessing the first cryptogram comprises, at the first time preceding the second time, storing a unique, static cryptogram generated by an external cryptogram generator.

3. The method of claim 1, wherein accessing the first cryptogram comprises, at the first time succeeding the second time, at a local cryptogram generator integrated into the dynamic transaction card, generating a single-use cryptogram for a next transaction.

4. The method of claim 1, further comprising, at a native application executing on the mobile computing device:
   receiving the first token from an external token generator on behalf of a financial institution affiliated with the dynamic transaction card;

storing the first token in local memory on the mobile computing device;

in response to establishing the wireless connection with the dynamic transaction card, transmitting the first token to the dynamic transaction card; and in response to confirmation of receipt of the first token from the dynamic transaction card, deleting the first token from local memory on the mobile computing device.

5. The method of claim 1:

wherein establishing the wireless connection with the mobile computing device comprises, at the dynamic transaction card:

detecting activation of the dynamic transaction card at approximately the second time; and in response to activation of the dynamic transaction card, transmitting a query for a token to the mobile computing device over the wireless connection;

further comprising, at a native application executing on the mobile computing device:

receiving the first token from an external token generator on behalf of a financial institution affiliated with the dynamic transaction card;

returning the first token to the dynamic transaction card in response to receipt of the query;

in response to confirmation of receipt of the first token from the dynamic transaction card, deleting the first token from local memory on the mobile computing device; and further comprising, at the dynamic transaction card, in response to passage of a threshold duration of time following the third time, deleting the first token from the dynamic transaction card.

6. The method of claim 1:

wherein driving the magnetic stripe emulator comprises driving the magnetic stripe emulator according to the first magnetic stripe sequence command while the wireless connection is current; and further comprising, in response to failure of the wireless connection, deleting the first token from the dynamic transaction card.

7. The method of claim 1, further comprising:

at a native application executing on the mobile computing device:

receiving a loyalty account associated with a loyalty program;

at the dynamic transaction card:

downloading a second magnetic stripe sequence command representing the loyalty account from the mobile computing device via the wireless connection;

storing the second magnetic stripe sequence command in local memory of the dynamic transaction card;

at a fourth time succeeding the third time, in response to receiving a selection of the loyalty account and detecting a second magnetic stripe card reader proximal the magnetic stripe emulator, driving the magnetic stripe emulator according to the second magnetic stripe sequence command.

8. The method of claim 7:

further comprising, in response to detecting the wireless connection, receiving a current location of the mobile computing device; and wherein driving the magnetic stripe emulator according to the second magnetic stripe sequence command comprises:

selecting the loyalty account based on relevance of the loyal account at the current location; and in response to selection of the loyalty account, driving the magnetic stripe emulator according to the second magnetic stripe sequence command.

9. The method of claim 1:

wherein accessing the first cryptogram comprises accessing the first cryptogram comprising a thirty-two-bit bitstring;

wherein downloading the first token comprises generating the first token comprising a sixteen-bit bitstring at a local token generator; and wherein generating the first magnetic stripe sequence command comprises compiling the thirty-two-bit bitstring and the sixteen-bit bitstring into the first magnetic stripe sequence command.

10. The method of claim 1, further comprising, in response to detecting a chip-card reader at a chip-card circuit integrated into the dynamic transaction card, outputting the first token and the first cryptogram via the integrated chip-card circuit.

11. The method of claim 1, wherein generating the first magnetic stripe sequence command further comprises generating the first magnetic stripe sequence command in Format B representing the first token in place of a primary account number in the first magnetic stripe sequence command and representing the first cryptogram in place of a pin verification value in the first magnetic stripe sequence command.

12. The method of claim 1:

further comprising, at a native application executing on the mobile computing device:

receiving the first token from an external token generator on behalf of a financial institution affiliated with the dynamic transaction card;

storing the first token in local memory on the mobile computing device;

wherein establishing the wireless connection with the mobile computing device comprises, at the dynamic transaction card:

detecting activation of the dynamic transaction card at approximately the second time; and in response to activation of the dynamic transaction card, transmitting a query for a token to the mobile computing device over the wireless connection;

wherein accessing the first token comprises receiving the first token from the mobile computing device; and further comprising, at the dynamic transaction card, in response to passage of a threshold duration of time following the third time, deleting the first token from the dynamic transaction card.

13. The method of claim 12:

wherein accessing the first cryptogram comprises storing a group of cryptograms comprising the first cryptogram and a second cryptogram;

wherein accessing the first token comprises downloading the first token from the mobile computing device, the first token generated by an external token generator and representing a first payment method associated with a financial account;

further comprising:

at the native application, in response to receipt of fraud detection related to the financial account, downloading a second token representing a second payment method associated with the financial account;

at the dynamic transaction card:
  downloading the second token from the mobile computing device via the wireless connection;
  generating a second magnetic stripe sequence command representing the second cryptogram and the second token; and
  in response to detecting a second magnetic stripe card reader proximal the magnetic stripe emulator, driving the magnetic stripe emulator according to the second magnetic stripe sequence command.

14. The method of claim 12, further comprising, at the native application:
downloading the first token and a graphical representation of a first payment method associated with a financial account hosted by the financial institution; and
rendering the graphical representation of the first payment method within the native application to indicate activation of the first payment method within the financial account.

15. The method of claim 12, wherein detecting activation of the dynamic transaction card comprises, at approximately the second time, transitioning from a low-power state into a payment mode in response to detecting a signal, output by a piezoelectric transducer arranged within the dynamic transaction card, that exceeds a preset threshold magnitude, the piezoelectric transducer configured to output a signal of magnitude corresponding to a degree of deflection of the dynamic transaction card out of a plane defined by a surface of the dynamic transaction card.

16. The method of claim 12, further comprising:
wherein receiving the first token at the native application comprises receiving a group of tokens from the external token generator, the group of tokens comprising the first token and a second token distinct from the first token;
further comprising, at a fourth time succeeding the third time:
  at the dynamic transaction card, transmitting a second query for a token to the mobile computing device at approximately the third time in response to activation of the dynamic transaction card;
  downloading the second token from the mobile computing device;
  generating a second magnetic stripe sequence command representing the first cryptogram and the second token; and
  in response to detecting a second magnetic stripe card reader proximal the magnetic stripe emulator at a fifth time succeeding and within a threshold duration of the fourth time, driving the magnetic stripe emulator according to the second magnetic stripe sequence command.

17. The method of claim 16, further comprising:
at the dynamic transaction card, transmitting confirmation of emulation of the first token at the magnetic stripe emulator to the mobile computing device in response to driving the magnetic stripe emulator according to the first magnetic stripe sequence command; and
at the native application, deleting the first token from local memory in response to receiving confirmation of emulation of the first token from the dynamic transaction card.

18. The method of claim 1:
further comprising, in response to failure of the wireless connection:
entering an inactive mode, the magnetic stripe emulator deactivated in the inactive mode;
in response to receipt of a passcode entered on a surface of the dynamic transaction card, entering an active mode; and
wherein driving the magnetic stripe emulator according to the first magnetic stripe sequence command comprises, in the active mode, in response to detecting a magnetic stripe card reader proximal the magnetic stripe emulator, driving the magnetic stripe emulator according to the first magnetic stripe sequence command.

19. The method of claim 1:
wherein generating the first magnetic stripe sequence command comprises generating the first magnetic stripe sequence command representing a first payment method;
wherein driving the magnetic stripe emulator according to the first magnetic stripe sequence command comprises, at approximately the third time, driving the magnetic stripe emulator according to the first magnetic stripe sequence command in a first transaction; and
further comprising:
at a native application executing on the mobile computing device:
  downloading a second payment method;
at the dynamic transaction card:
  downloading a second magnetic stripe sequence command representing the second payment method from the mobile computing device via the wireless connection;
  storing the second magnetic stripe sequence command in local memory of the dynamic transaction card; and
  in response to failure of the first transaction at a POS system and in response to detection of the magnetic stripe card reader proximal the dynamic transaction card within a threshold duration of the third time, driving the magnetic stripe emulator according to the second magnetic stripe sequence command in a second transaction.

20. The method of claim 19, further comprising:
at the third time, in response to success of the first transaction, at the native application executed by the mobile computing device recording a first location of the first transaction;
at approximately the fourth time, in response to failure of the first transaction and success of the second transaction at the POS system comprising the magnetic stripe reader, at the native application executed by the mobile computing device, recording a second location of the second transaction;
at the native application:
  receiving transaction information from the dynamic transaction card identifying the first location and the second location
  associating the first location with the first transaction method;
  associating the second location with the second transaction method; and
  generating a map identifying security preferences of points of sale based on the first location and the second location.

21. A method comprising, at a dynamic transaction card:
at a first time, accessing a first cryptogram;
at a second time, establishing a wireless connection with a mobile computing device;
in response to establishing the wireless connection with the mobile computing device, accessing a first token associated with the first cryptogram;

generating a first magnetic stripe sequence command comprising a first track sequence command representing the first token and a second track sequence command representing the first cryptogram; and in response to detecting a magnetic stripe card reader proximal a magnetic stripe emulator integrated into the dynamic transaction card at a third time succeeding the second time, driving a first track of the magnetic stripe emulator according to the first track sequence command and driving a second track of the magnetic stripe emulator according to the second track sequence command.

* * * * *